(12) United States Patent
Chen et al.

(10) Patent No.: US 10,921,696 B2
(45) Date of Patent: Feb. 16, 2021

(54) ILLUMINATION SYSTEM AND PROJECTION APPARATUS

(71) Applicant: Coretronic Corporation, Hsin-Chu (TW)

(72) Inventors: Shun-Tai Chen, Hsin-Chu (TW); Shu-Yu Lin, Hsin-Chu (TW); Ming-Tsung Weng, Hsin-Chu (TW); Chen-Yi Hong, Hsin-Chu (TW); Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 48 days.

(21) Appl. No.: 16/554,616

(22) Filed: Aug. 29, 2019

(65) Prior Publication Data

US 2020/0073219 A1 Mar. 5, 2020

(30) Foreign Application Priority Data

Aug. 31, 2018 (CN) .......................... 2018 1 1009876

(51) Int. Cl.
| | |
|---|---|
| *G03B 21/20* | (2006.01) |
| *G02B 26/00* | (2006.01) |
| *G03B 33/08* | (2006.01) |
| *F21V 9/40* | (2018.01) |

(52) U.S. Cl.
CPC ......... *G03B 21/2033* (2013.01); *G02B 26/00* (2013.01); *G03B 21/20* (2013.01); *G03B 21/2066* (2013.01); *G03B 33/08* (2013.01); *F21V 9/40* (2018.02)

(58) Field of Classification Search
CPC ........... G03B 21/2033; G03B 21/2066; G03B 33/08; G03B 21/204; G03B 21/20; F21V 9/40; G02B 26/008; G02B 26/00
See application file for complete search history.

(56) References Cited

U.S. PATENT DOCUMENTS

| | | | |
|---|---|---|---|
| 2013/0250544 A1* | 9/2013 | Zink ................... | C09K 11/7774 362/84 |
| 2015/0354787 A1* | 12/2015 | Chang ................... | G03B 33/08 362/84 |
| 2015/0362830 A1* | 12/2015 | Liao ..................... | G03B 21/204 353/31 |

(Continued)

*Primary Examiner* — Michelle M Iacoletti
*Assistant Examiner* — Magda Cruz
(74) *Attorney, Agent, or Firm* — JCIPRNET

(57) ABSTRACT

An illumination system including a first excitation light source, a wavelength conversion wheel, and a filter wheel is provided. The first excitation light source is configured to emit a first excitation beam. The wavelength conversion wheel includes a wavelength conversion region and a first optical region. The wavelength conversion region and the first optical region alternately enter a transmission path of the first excitation beam. The first excitation beam is converted into a conversion beam by the wavelength conversion region when the wavelength conversion region enters the transmission path of the first excitation beam. The filter wheel includes a first region, a second region, and a blocking region. An angle covered by the second region in a circumferential direction is smaller than an angle covered by the first optical region. A projection apparatus is also provided.

36 Claims, 16 Drawing Sheets

(56) References Cited

U.S. PATENT DOCUMENTS

| | | | |
|---|---|---|---|
| 2016/0109789 A1* | 4/2016 | Zhao | G02B 26/008 |
| | | | 362/84 |
| 2016/0165194 A1* | 6/2016 | Hartwig | H04N 9/3111 |
| | | | 353/31 |
| 2017/0059979 A1* | 3/2017 | Hsu | G03B 21/204 |
| 2017/0097560 A1 | 4/2017 | Matsubara et al. | |
| 2017/0328540 A1* | 11/2017 | Paul | F21V 9/32 |
| 2018/0173087 A1* | 6/2018 | Hsieh | G03B 21/204 |
| 2019/0215498 A1* | 7/2019 | Chung | G03B 21/204 |

\* cited by examiner

ILLUMINATION SYSTEM AND PROJECTION APPARATUS

CROSS-REFERENCE TO RELATED APPLICATION

This application claims the priority benefit of China application serial no. 201811009876.7, filed on Aug. 31, 2018. The entirety of the above-mentioned patent applications is hereby incorporated by reference herein and made a part of this specification.

BACKGROUND OF THE INVENTION

1. Field of the Invention

The invention relates to an optical system and an optical apparatus, and particularly relates to an illumination system and a projection apparatus adopting the illumination system.

2. Description of Related Art

The imaging principle of a projection apparatus is to convert an illumination beam generated by an illumination system into an image beam through a light valve, and then project the image beam to a screen through a projection lens, so as to form an image. The illumination system of the projection apparatus includes a wavelength conversion wheel and a filter wheel. A plurality of optical regions of the wavelength conversion wheel respectively correspond to a plurality of filter regions of the filter wheel, so as to respectively generate colored light as need and transmit the colored light to the light valve.

In general, in order to avoid a color difference produced at the boundary between different regions, the light valve may be set to an OFF state (i.e., a state where the image beam converted by the light valve does not enter the projection lens) in this time interval. However, if the light valve cannot be set to the OFF state in this time interval, the image beam emitted in this time interval may render a color difference, which may affect the chromaticity coordinates and the contrast of the image beam.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The embodiments of the invention provide an illumination system capable of allowing a projection apparatus adopting the illumination system to avoid a color difference.

The embodiments of the invention provide a projection apparatus which avoids a color difference through a simple means.

Other objects and advantages of the invention can be further illustrated by the technical features broadly embodied and described as follows.

For one or part or all of the objects, an embodiment of the invention provides an illumination system including a first excitation light source, a wavelength conversion wheel, and a filter wheel. The first excitation light source is configured to emit a first excitation beam. The wavelength conversion wheel includes a wavelength conversion region and a first optical region. The wavelength conversion region and the first optical region alternately enter a transmission path of the first excitation beam. The first excitation beam is converted into a conversion beam by the wavelength conversion region when the wavelength conversion region enters the transmission path of the first excitation beam. The first excitation beam is output from the first optical region when the first optical region enters the transmission path of the first excitation beam. The filter wheel is disposed on the transmission path of the conversion beam and the first excitation beam. The filter wheel includes a first region, a second region, and a blocking region. An angle covered by the second region in a circumferential direction is smaller than an angle covered by the first optical region.

For one or part or all of the objects, an embodiment of the invention provides another illumination system including a first excitation light source, a wavelength conversion wheel, and a filter wheel. The first excitation light source is configured to emit a first excitation beam. The wavelength conversion wheel includes a wavelength conversion region and a first optical region. The wavelength conversion region and the first optical region alternately enter a transmission path of the first excitation beam. The first excitation beam is converted into a conversion beam by the wavelength conversion region when the wavelength conversion region enters the transmission path of the first excitation beam. The first excitation beam is output from the first optical region when the first optical region enters the transmission path of the first excitation beam. The filter wheel is disposed on the transmission path of the conversion beam and the first excitation beam. The filter wheel includes a first region, a second region, and a blocking region. The blocking region is configured to block the first excitation beam or the conversion beam transmitted from the wavelength conversion wheel from passing through the filter wheel.

For one or part or all of the objects, an embodiment of the invention provides a projection apparatus, including the above illumination system, a light valve, and a projection lens. The illumination system is configured to emit an illumination beam. The light valve is disposed on a transmission path of the illumination beam to modulate the illumination beam to an image beam. The projection lens is disposed on a transmission path of the image beam.

Based on the above, in the illumination system according to the embodiments of the invention, the beam is blocked from passing through the filter wheel by arranging the blocking region in the desired interval. Therefore, the filter wheel can be prevented from outputting an undesired colored beam in the time interval when the beam is irradiated to the blocking region. Since the projection apparatus according to the embodiments of the disclosure adopts the illumination system, the color difference is avoided through a simple means.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
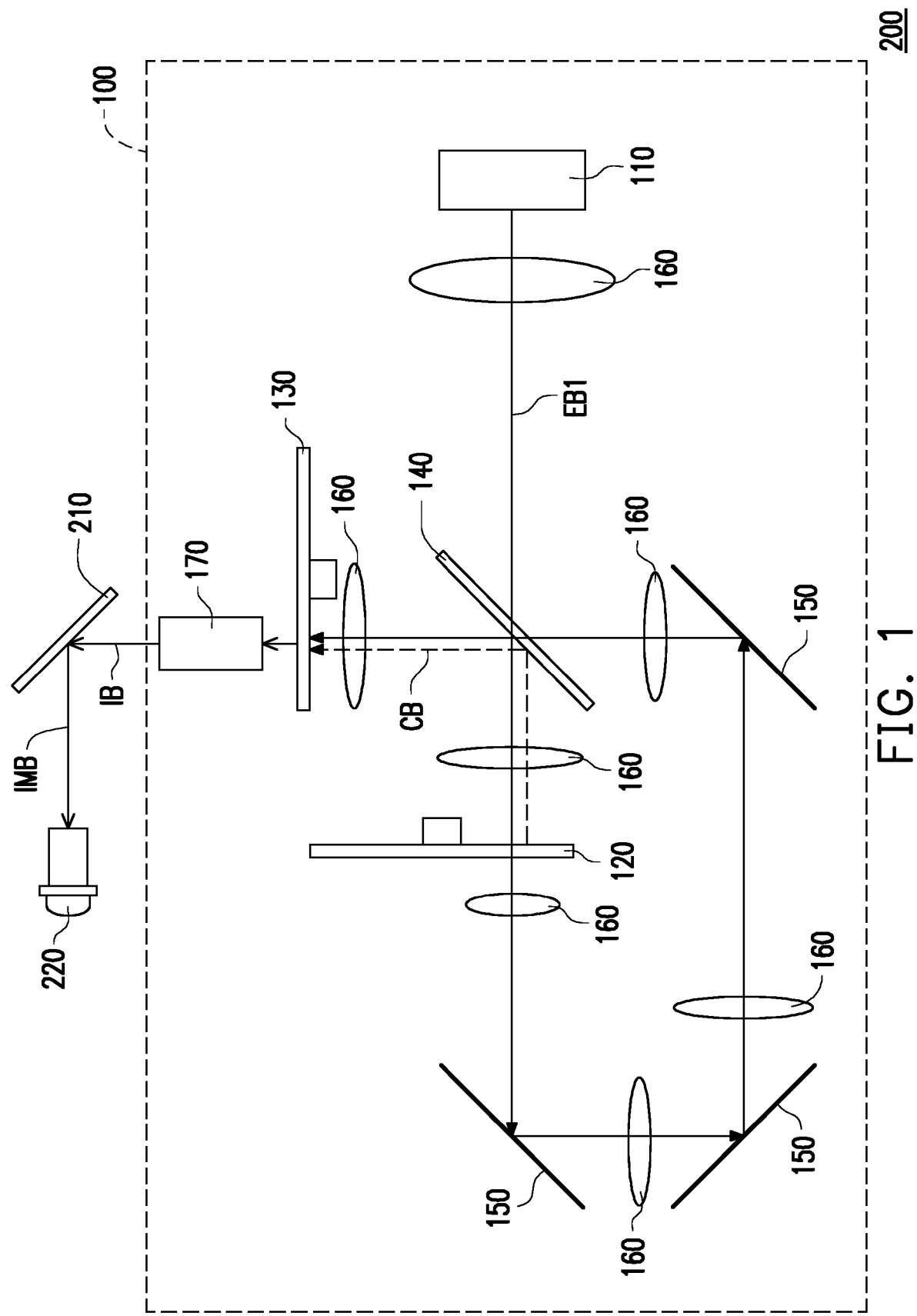
FIG. 1 is a schematic view illustrating a projection apparatus according to a first embodiment of the invention.
Figure 2A:
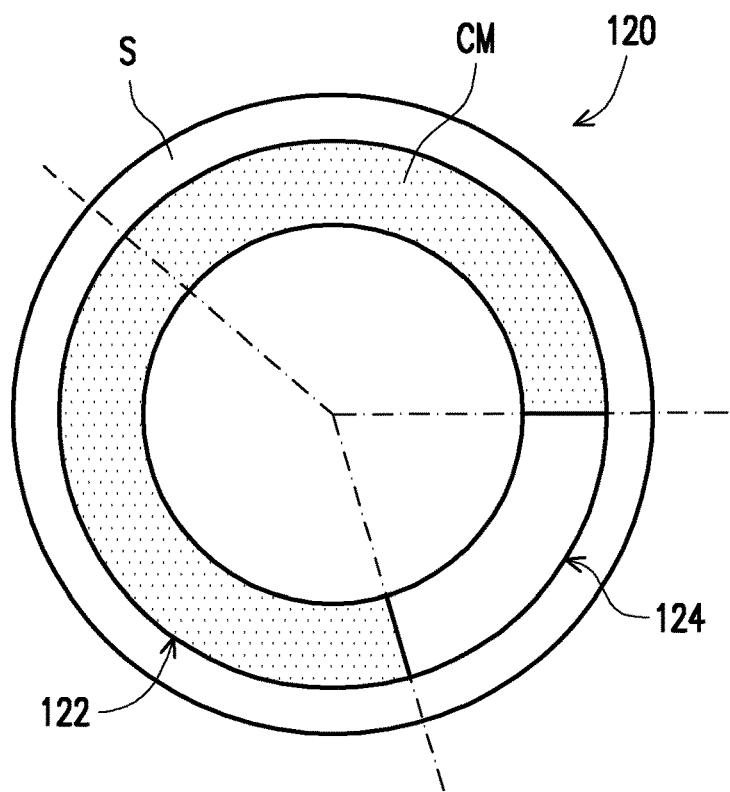
FIG. 2A is a schematic front view illustrating a wavelength conversion wheel of FIG. 1.
Figure 3:
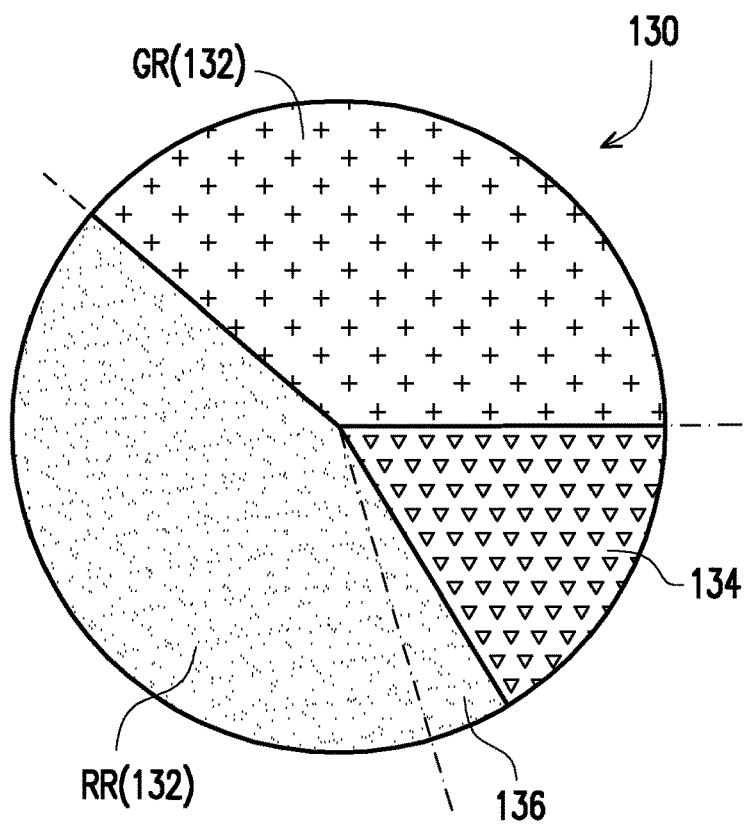
FIG. 3 is a schematic front view illustrating an example of a filter wheel of FIG. 1.
Figure 4:
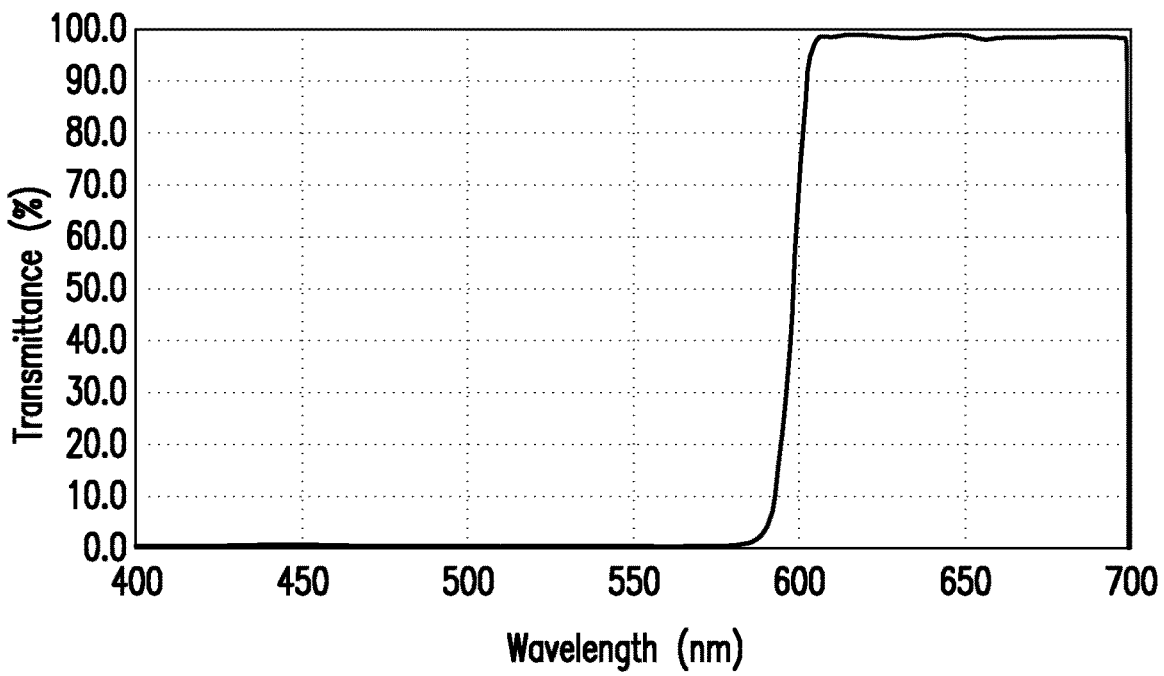
FIG. 4 is a diagram showing a transmittance spectrum of a red light filter region in FIG. 3.

FIG. 1 is a schematic view illustrating a projection apparatus according to a first embodiment of the invention. FIG. 2A is a schematic front view illustrating a wavelength conversion wheel of FIG. 1. FIG. 3 is a schematic front view illustrating an example of a filter wheel of FIG. 1. FIG. 4 is a diagram showing a transmittance spectrum of a red light filter region in FIG. 3. For the clarity of illustration, FIGS. 2A and 3, and subsequent related figures specifically show dashed lines to more easily indicate the angles of various regions of the wavelength conversion wheel and the filter wheel.

Referring to FIG. 1, a projection apparatus 200 of this embodiment includes an illumination system 100, a light valve 210, and a projection lens 220. The illumination system 100 is configured to emit an illumination beam D3. The light valve 210 is disposed on the transmission path of the illumination beam D3 to modulate the illumination beam D3 to an image beam IMB. The projection lens 220 is disposed on the transmission path of the image beam IMB, and is configured to project the image beam IMB onto a screen or a wall (not shown) to form an image frame. After the illumination beam D3 formed by beams of different colors is irradiated on the light valve 210, the light valve 210 converts the illumination beam D3 into the image beam IMB according to a time sequence and transmits the image beam IMB to the projection lens 220. Therefore, the image frame formed by the projection apparatus 200 projecting the image beam IMB converted by the light valve 210 may be a colored frame.

In this embodiment, the light valve 210 is, for example, a digital micro-mirror device (DMD) or a liquid-crystal-on-silicon panel (LCOS panel). However, in other embodiments, the light valve 210 may also be a transmissive liquid crystal panel or other spatial light modulators. In this embodiment, the projection lens 220 is, for example, a combination of one or more optical lenses having refracting power, for example. The one or more optical lenses include, for example, a non-flat lens such as a bioconcave lens, a bioconvex lens, a concave-convex lens, a convex-concave lens, a plano-convex lens, a plano-concave lens, etc., or a combination thereof. The invention does not intend to limit the configuration and the type of the projection lens 220.

In this embodiment, the illumination system 100 includes a first excitation light source 110, a wavelength conversion wheel 120, and a filter wheel 130. The first excitation light source 110 is configured to emit a first excitation beam EB1, and when the illumination system 100 is turned on and used, it is not necessary to turn off the first excitation light source 110. The wavelength conversion wheel 120 and the filter wheel 130 are disposed on the transmission path of the first excitation beam EB1.

In this embodiment, the first excitation light source 110 generally refers to a light source capable of emitting a short-wavelength beam, and the peak wavelength of the short-wavelength beam falls, for example, within a wavelength range of blue light or a wavelength range of ultraviolet light. Here, peak wavelength is defined as the wavelength corresponding to the highest light intensity. In this embodiment, the peak wavelength of the first excitation beam EB1 is, for example, a wavelength of 455 nm. However, the invention is not limited thereto. The first excitation light source 110 includes a laser diode (LD), a light emitting diode (LED), or an array or bank or a group formed by either of the above. Nevertheless, the invention is not limited thereto. In this embodiment, the first excitation light source 110 is a laser light emitting element including a laser diode. The first excitation light source 110 may be, for example, a blue laser diode bank, and the first excitation beam EB1 is a blue laser beam, but the invention is not limited thereto.

Referring to FIG. 1 and FIG. 2A, in this embodiment, the wavelength conversion wheel 120 is a rotatable disk-shaped member, such as a phosphor wheel. The wavelength conversion wheel 120 includes a wavelength conversion region 122 and a first optical region 124, and converts the short-wavelength beam transmitted to the wavelength conversion region 122 into a long-wavelength beam. Specifically, the wavelength conversion wheel 120 includes a substrate S. The substrate S has the wavelength conversion region 122 and the first optical region 124 arranged in a ring shape, and the substrate S is, for example, a reflective substrate. A wavelength conversion substance CM is disposed in the wavelength conversion region 122, and the wavelength conversion substance CM is, for example, a phosphor powder through which a yellow beam is produced (hereinafter referred to as a yellow phosphor powder). The first optical region 124 is, for example, a transmissive region, and may be a region formed by a transparent plate embedded in the substrate S or a via penetrating through the substrate S. In this embodiment, the wavelength conversion region 122 and the first optical region 124 alternately enter the transmission path of the first excitation beam EB1. When the wavelength conversion region 122 enters the transmission path of the first excitation beam EB1, the first excitation beam EB1 is converted into a conversion beam CB by the wavelength conversion region 122, and the conversion beam CB is reflected by the substrate S. When the first optical region 124 enters the transmission path of the first excitation beam EB1, the first excitation beam EB1 passes through the wavelength conversion wheel 120 and is output from the first optical region 124. The conversion beam CB is, for example, a yellow beam. In other embodiments, the wavelength conversion wheel 120 may also include a plurality of wavelength conversion regions that convert the first excitation beam EB1 to light of different colors respectively.

Figure 2B:
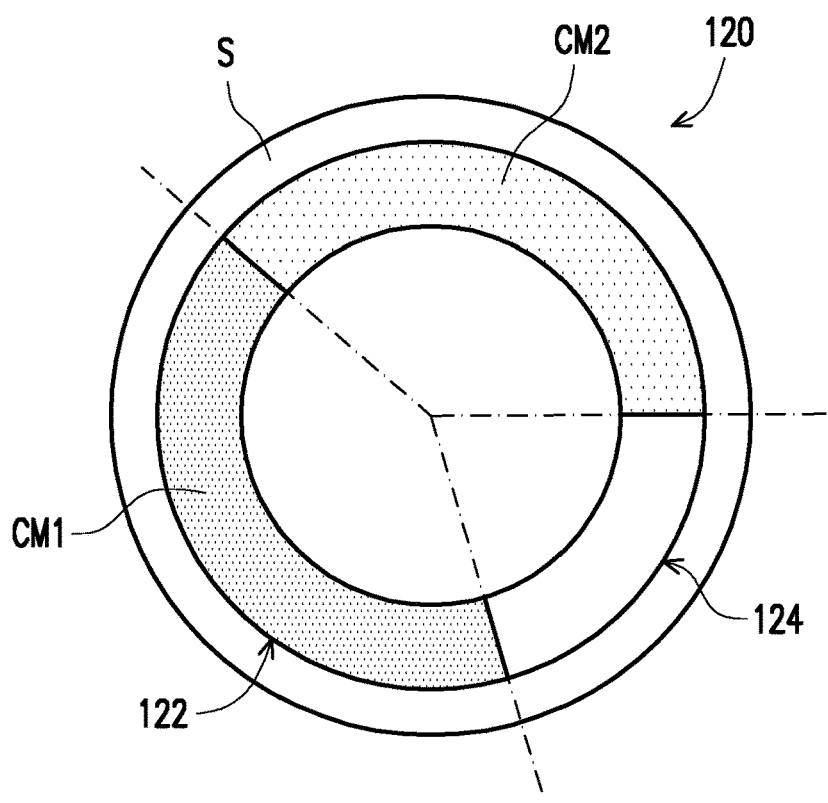
FIG. 2B is a schematic front view illustrating another wavelength conversion wheel of FIG. 1.

Referring to FIGS. 1 and 2B, FIG. 2B is a schematic front view illustrating another wavelength conversion wheel of FIG. 1. The difference between the wavelength conversion wheels in FIG. 2A and FIG. 2B is that the wavelength conversion wheel 120 in FIG. 2B has two wavelength conversion regions 122. However, the invention is not limited thereto. The two wavelength conversion regions 122 respectively have two different wavelength conversion substances CM1 and CM2. The wavelength converting substance CM1 is, for example, a phosphor powder through which a yellow beam is generated, and the wavelength converting substance CM2 is, for example, a phosphor powder through which a green beam is generated. However, the invention is not limited thereto.

Referring to FIG. 1 and FIG. 3, in this embodiment, the filter wheel 130 is a rotatable disk-shaped member. The filter wheel 130 is configured to filter out (reflect or absorb) beams other than beams within a specific wavelength range and allows beams within this specific wavelength range to pass through, so as to enhance the color purity of colored light and thereby form the illumination beam D3. The filter wheel 130 includes a first region 132, a second region 134, and a blocking region 136, and the first region 132, the second region 134, and the blocking region 136 sequentially enter the transmission path of any of the first excitation beam EB1 and the conversion beam CB from the wavelength conversion wheel 120. The first region 132 includes at least one filter region. The number of filter regions of the first region 132 may be one or more, and the conversion beam CB is irradiated to the at least one filter region of the first region 132. In this embodiment, the first region 132 is described with an example of two filter regions, and includes a red light filter region RR and a green light filter region GR. For example, the red light filter region RR may allow a beam within the wavelength range of red light to pass through and filter out beams within other wavelength ranges. The green light filter region GR may allow a beam within the wavelength range of green light to pass through and filter out beams within other wavelength ranges. The second region 134 may be a light transmissive region and is configured with a diffuser, a diffusion particle, or a diffusion structure, for example, for reducing or eliminating the laser speckle phenomenon of the first excitation beam EB1. The second region 134 may also be a blue light filter region, which allows a beam within the wavelength range of blue light to pass through and filters out beams within other wavelength ranges. However, the invention is not limited thereto. In addition, the blocking region 136 is configured to block unnecessary/undesired beams, such as the first excitation beam D31, from passing through the filter wheel 130. Specifically, when the conversion beam CB is transmitted to the red light filter region RR or the green light filter region GR, the conversion beam CB is filtered to form a red beam or a green beam. When the first excitation beam EB1 is transmitted to the second region 134, the second region 134 allows the first excitation beam EB1 to pass through to serve as a blue beam, for example. When the conversion beam CB or the first excitation beam EB1 from the wavelength conversion wheel 120 is transmitted to the blocking region 136, the first excitation beam EB1 does not pass through the blocking region 136.

It should be noted that the position of the blocking region 136 may be arranged in correspondence with the interval in which the unwanted beam passes through. For example, within the time interval when the beam is irradiated at the boundary between the first region 132 and the second region 134, if the light valve 210 cannot be set in the OFF state within this time interval, the blocking region 136 disposed at the boundary between the first region and the second region 134 may block the undesired beam from passing through the filter wheel 130, thereby preventing the light valve 210 from generating the image beam IMB within this time interval and from transmitting the image beam IMB to the projection lens 220.

Referring to FIG. 2A and FIG. 3, in this embodiment, the blocking region 136 is disposed/connected between the at least one filter region of the first region 132 and the second region 134, and the blocking region 136 may be arranged in correspondence with the boundary portion of the first optical region 124 of the wavelength conversion wheel 120. The angle covered by the first region 132 in the circumferential direction is equal to the angle covered by the wavelength conversion region 122 in the circumferential direction, and the angle covered by the second region 134 and the blocking region 136 in the circumferential direction is equal to the angle covered by the first optical region 124 in the circumferential direction. In detail, in the time interval when the first excitation beam EB1 transmits to the wavelength conversion region 122 of the wavelength conversion wheel 120, the conversion beam CB converted by the wavelength conversion region 122 sequentially transmits to the red light filter region RR and the green light filter region GR of the first region 132 of the filter wheel 130. In the time interval when the first excitation beam EB1 transmits to the first optical region 124 of the wavelength conversion wheel 120, the first excitation beam EB1 output from the first optical region 124 sequentially transmits to the second region 134 and the blocking region 136 of the filter wheel 130. Moreover, in this embodiment, the angle covered by the second region 134 of the filter wheel 130 in the circumferential direction is smaller than the angle covered by the first optical region 124 of the wavelength conversion wheel 120 in the circumferential direction.

In this embodiment, the angle covered by the green light filter region GR of the first region 132 of the filter wheel 130 in the circumferential direction is, for example, 130 degrees, the angle covered by the red light filter region RR of the first region 132 in the circumferential direction is, for example, 172 degrees, the angle covered by the second region 134 in the circumferential direction is, for example, 55.23 degrees, the angle covered by the blocking region 136 in the circumferential direction is, for example, 2.77 degrees. However, the invention is not limited thereto. The angle covered by the green light filter region GR of the first region 132, the red light filter region RR of the first region 132, the second region 134, or the blocking region 136 of the filter wheel 130 in the circumferential direction may also be other angles.

As shown in FIG. 3, the blocking region 136 is connected between the red light filter region RR and the second region 134. In this embodiment, the blocking region 136 and the red light filter region RR are made of the same material and have the same light filtering properties. In other words, the blocking region 136 may be an extended portion of the red light filter region RR. As shown in FIG. 4, the red light filter region RR has the maximum transmittance within the wavelength range between about 600 nm and 700 nm, and the first excitation beam EB1 with a wavelength of 455 nm, for example, has a transmittance of less than about 1.0% in the red light filter region RR. Since the blocking region 136 is the extended portion of the red light filter region RR, when the first excitation beam EB1 transmits to the blocking region 136 of the filter wheel 130, the blocking region 136 can effectively block the first excitation beam EB1 from passing through.

Figure 5:
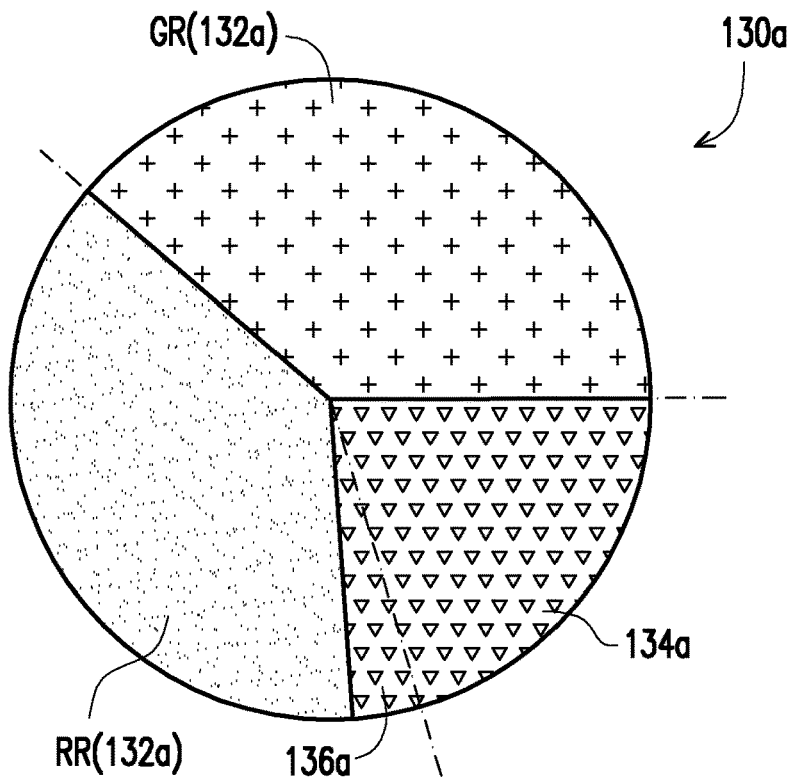
FIG. 5 is a schematic front view illustrating another example of the filter wheel of FIG. 1.

In other embodiments, the blocking region 136 may also be connected between the green light filter region GR and the second region 134, and the blocking region 136 and the green light filter region GR are made of the same material. In other words, the blocking region 136 may be an extended portion of the green light filter region GR, and the blocking region 136 blocks the first excitation beam EB1 from passing through the blocking region 136. FIG. 5 is a schematic front view illustrating another example of the filter wheel of FIG. 1. Referring to FIG. 5, the difference between a filter wheel 130a of this embodiment and the filter wheel 130 of FIG. 3 is that the second region 134 of the filter wheel 130 is, for example, a light transmissive region or a blue light filter region, while a second region 134a of the filter wheel 130a is, for example, a blue light filter region, which allows beams within the wavelength range of blue light to pass through and filters out beams within other wavelength ranges.

In addition, referring to FIG. 2A and FIG. 5, in this embodiment, a blocking region 136a may be arranged in correspondence with the boundary portion of the wavelength conversion region 122 of the wavelength conversion wheel 120. The angle covered by a first region 132a and the blocking region 136a in the circumferential direction is equal to the angle covered by the wavelength conversion region 122 in the circumferential direction, and the angle covered by the second region 134a in the circumferential direction is equal to the angle covered by the first optical region 124 in the circumferential direction. In detail, in the time interval when the first excitation beam EB1 transmits to the wavelength conversion region 122 of the wavelength conversion wheel 120, the conversion beam CB converted by the wavelength conversion region 122 sequentially transmits to the blocking region 136a and the red light filter region RR and the green light filter region GR in the first region 132a of the filter wheel 130a. In the time interval when the first excitation beam EB1 transmits to the first optical region 124 of the wavelength conversion wheel 120, the first excitation beam EB1 output from the first optical region 124 transmits to the second region 134a of the filter wheel 130a.

In this embodiment, as shown in FIG. 5, the blocking region 136a is connected between the red light filter region RR and the second region 134a (e.g., a blue light filter region). The blocking region 136a and the second region 134a are made of the same material. That is, the blocking region 136a is an extended portion of the second region 134a. Therefore, when the conversion beam CB, as a yellow beam for example, transmits to the blocking region 136a of the filter wheel 130a, the blocking region 136a can effectively block the conversion beam CB from passing through. That is, the blocking region 136a blocks the conversion beam CB from passing through the blocking region 136a.

In other embodiments, the blocking region 136a may be disposed/connected between the green light filter region GR and the second region 134a, and the blocking region 136a and the second region 134a are made of the same material and have the same light filtering properties. That is, the blocking region 136a is an extended portion of the second region 134a.

Figure 6A:
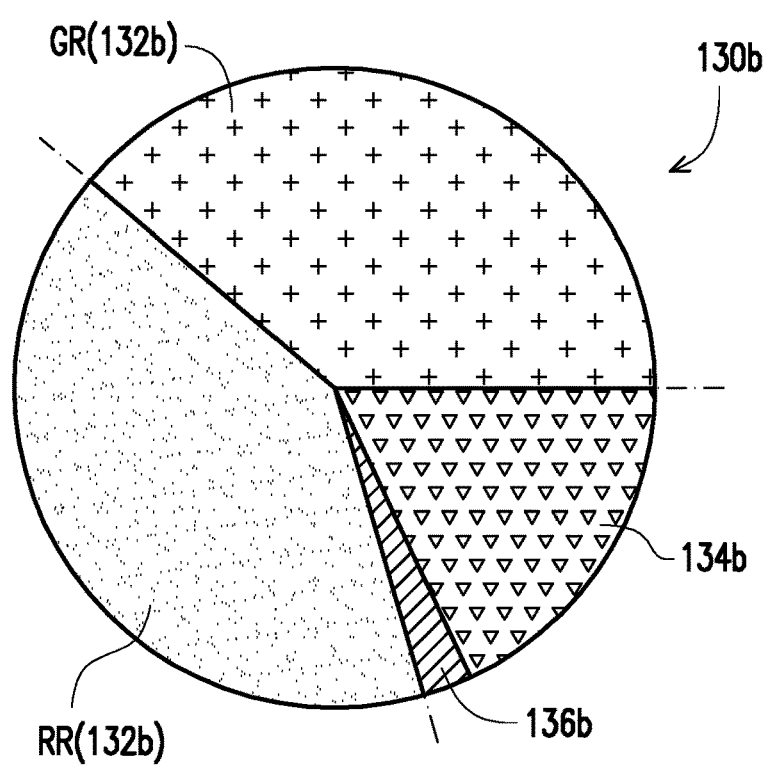
FIGS. 6A to 6C are schematic front views illustrating some other examples of the filter wheel of FIG. 1.
Figure 6B:
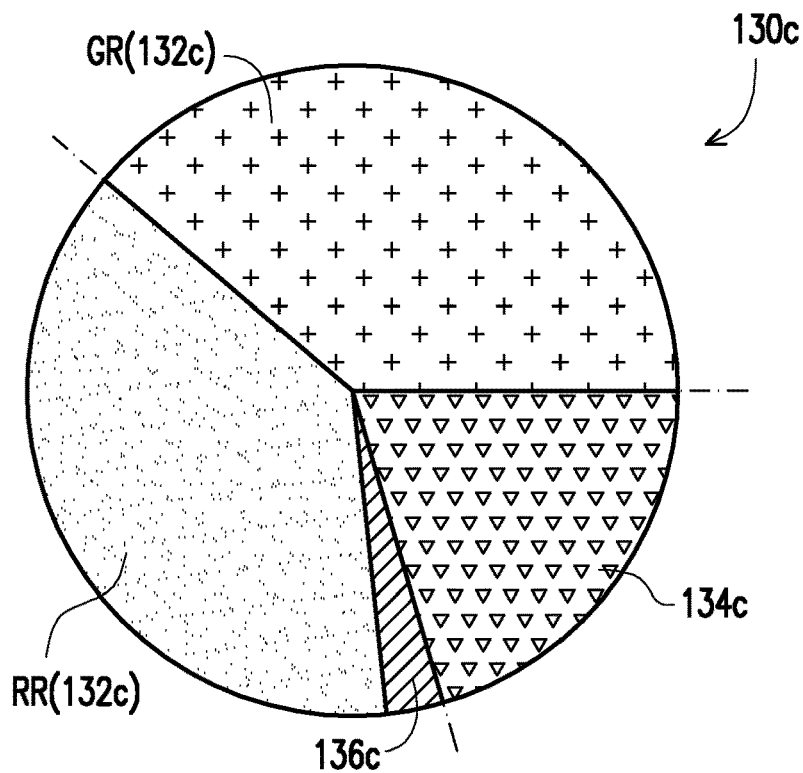
Figure 6C:
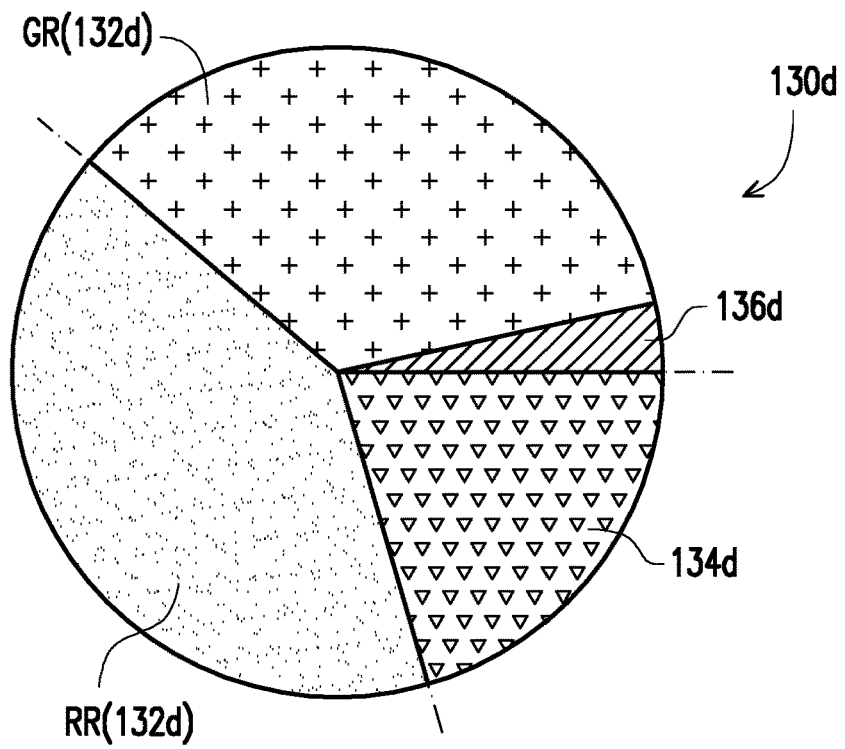

FIGS. 6A to 6C are schematic front views illustrating some other examples of the filter wheel of FIG. 1. Referring to FIG. 6A to FIG. 6C, the filter wheel of this embodiment is different from the filter wheel in the foregoing embodiment in that the blocking region of the filter wheel in the foregoing embodiment is made of the same material as the at least one filter region of the first region or the second region, whereas the blocking region of the filter wheel of the embodiment is, for example, a black absorption region, and the black absorption region may be coated with a completely black dye or gel for absorbing all beams. Therefore, the blocking region of this embodiment can also effectively block the conversion beam CB or the first excitation beam EB1 from the wavelength conversion wheel 120 from passing through. In addition, in this embodiment, the second region may be a light transmissive region, or may be a blue light filter region. However, the invention is not limited thereto.

In this embodiment, the blocking region may be arranged in correspondence with the boundary portion of the wavelength conversion region 122 or the first optical region 124 of the wavelength conversion wheel 120. For example, as shown in FIG. 2A and FIG. 6A, a blocking region 136b of a filter wheel 130b is arranged in correspondence with a portion of the first optical region 124 of the wavelength conversion wheel 120, and the blocking region 136b is connected between the red light filter region RR of a first region 132b and a second region 134b. In other embodiments, the blocking region 136b may be arranged in correspondence with the boundary portion of the first optical region 124 of the wavelength conversion wheel 120, and the blocking region 136b is connected between the green light filter region GR of the first region 132b and the second region 134b.

As shown in FIG. 2A and FIG. 6B, a blocking region 136c of a filter wheel 130c is arranged in correspondence with the boundary portion of the wavelength conversion region 122 of the wavelength conversion wheel 120, and the blocking region 136c is connected between the red light filter region RR of a first region 132c and a second region 134c. In other embodiments, the blocking region 136c may also be arranged in correspondence with a portion of the wavelength conversion region 122 of the wavelength conversion wheel 120, and the blocking region 136c is connected between the red light filter region RR and the green light filter region GR.

As shown in FIG. 2A and FIG. 6C, a blocking region 136d of a filter wheel 130d is arranged in correspondence with a portion of the wavelength conversion region 122 of the wavelength conversion wheel 120, and the blocking region 136d is connected between the green light filter region GR of a first region 132d and a second region 134d. In other embodiments, the blocking region 136d may be arranged in correspondence with the boundary portion of the wavelength conversion region 122 of the wavelength conversion wheel 120, and the blocking region 136d is connected between the red light filter region RR and the green light filter region GR.

Through the above configuration of the blocking region, the beam from the wavelength conversion wheel can be blocked from passing through the filter wheel by arranging the blocking region in a desired interval. Therefore, the filter wheel can be prevented from outputting an undesired colored beam in the time interval when the beam is irradiated to the blocking region. In this way, a color difference of the image beam can be avoided.

Referring to FIG. 1, in this embodiment, the illumination system 100 further includes a light splitting and combining module 140 and a plurality of reflecting mirrors 150. The light splitting and combining module 140 is located between the first excitation light source 110 and the wavelength conversion wheel 120 and is located on the transmission path of the conversion beam CB and the first excitation beam EB1 passing through the wavelength conversion wheel 120. The reflecting mirrors 150 are located on the transmission path of the first excitation beam EB1 passing through the wavelength conversion wheel 120 and serve to transmit the first excitation beam EB1 passing through the wavelength conversion wheel 120 back to the light splitting and combining module 140. Specifically, the light splitting and combining module 140 may be, for example, a dichroic mirror (DM) or a dichroic prism, and can provide different optical effects on beams of different colors. For example, in this embodiment, the light splitting and combining module 140 may, for example, allow the first excitation beam EB1 to pass through and reflect the conversion beam CB. Accordingly, the light splitting and combining module 140 may transmit the first excitation beam EB1 from the first excitation light source 110 to the wavelength conversion wheel 120. In addition, after the reflecting mirrors 150 reflect the first excitation beam EB1 passing through the wavelength conversion wheel 120 and transmit the first excitation beam EB1 back to the light splitting and combining module 140, the light splitting and combining module 140 may combine the conversion beam CB from the wavelength conversion wheel 120 and the first excitation beam EB1 passing through the wavelength conversion wheel 120 and transmit them to the filter wheel 130.

In addition, the illumination system 100 may further include a plurality of lenses 160 and a light uniforming element 170 disposed on the transmission path of the first excitation beam EB1. The lenses 160 are configured to adjust the beam path inside the illumination system 100. The light uniforming element 170 is configured to uniform the first excitation beam EB1 from the filter wheel 130 and the red beam and the green beam passing through the filter wheel 130 and transmit them to the light valve 210. In this embodiment, the light uniforming element 170 is, for example, an integration rod or a lens array, such as a fly-eye lens array. However, the invention is not limited thereto. In other embodiments, the light uniforming element 170 may be disposed between the light splitting and combining module 140 and the filter wheel 130. In detail, the light uniforming element 170 is disposed between the lens 160 and the filter wheel 130.

It should be noted that the following embodiments use part of the foregoing embodiments, and the description of the same technical content is omitted. For those referred to with the same element names, reference is drawn to parts of the foregoing embodiments, and will not be repeated in the following embodiments.

Figure 7:
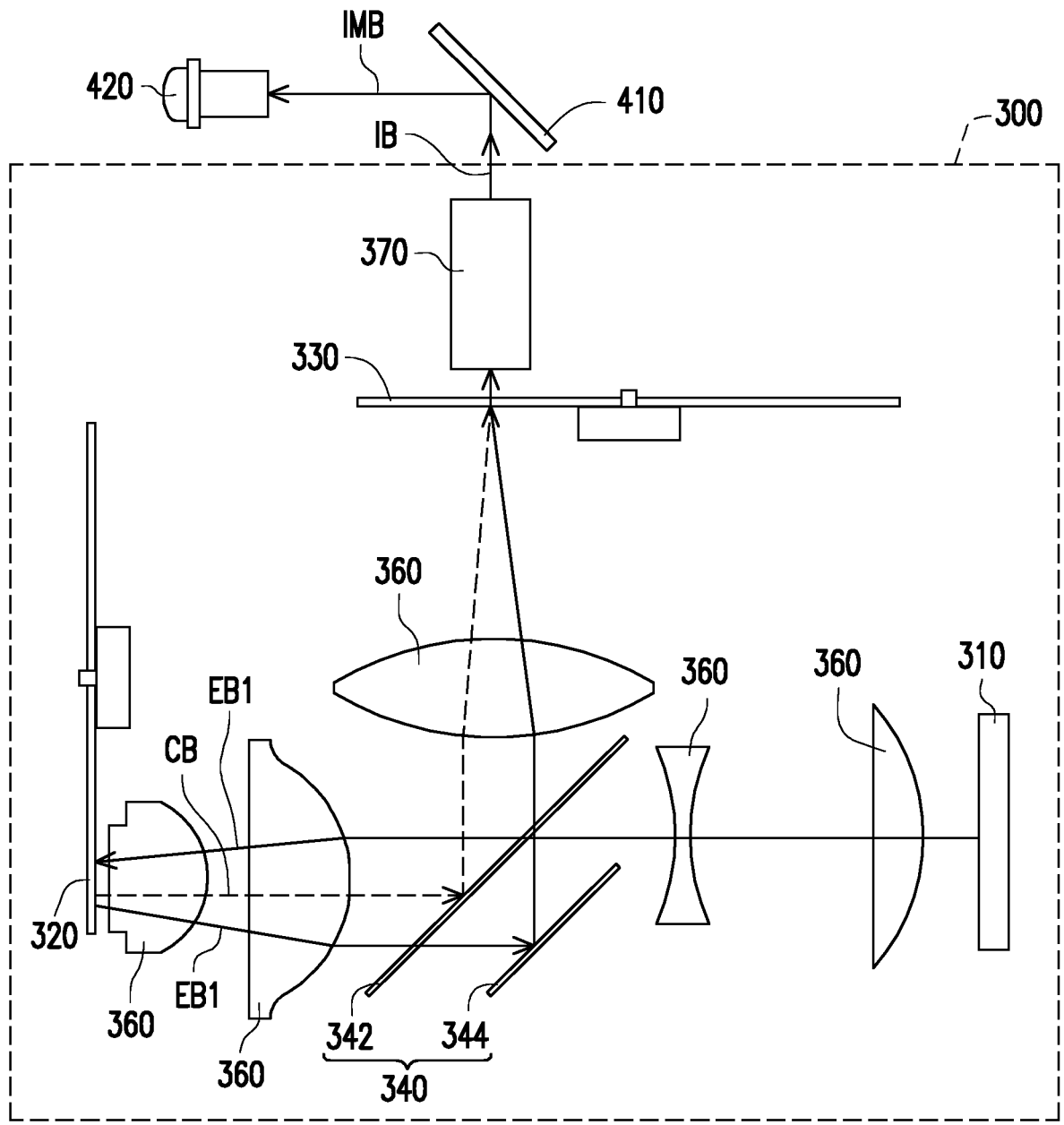
FIG. 7 is a schematic view illustrating a projection apparatus according to a second embodiment of the invention.
Figure 8:
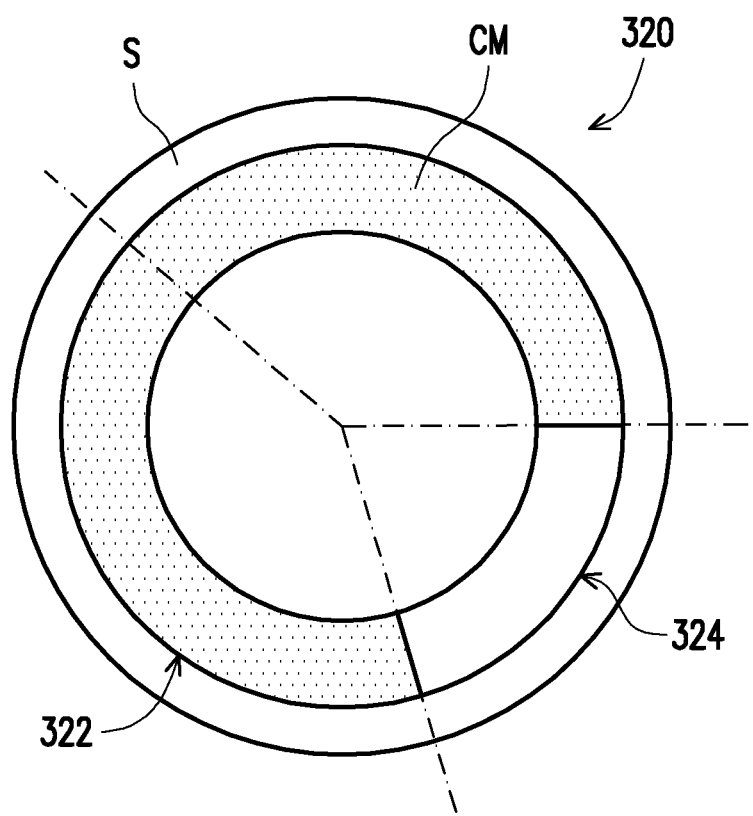
FIG. 8 is a schematic front view illustrating a wavelength conversion wheel of FIG. 7.

FIG. 7 is a schematic view illustrating a projection apparatus according to a second embodiment of the invention. FIG. 8 is a schematic front view illustrating a wavelength conversion wheel of FIG. 7. In the embodiment shown in FIG. 7 to FIG. 8, the configurations and functions of a first excitation light source 310, a filter wheel 330, lenses 360, a light uniforming element 370, a light valve 410, and a projection lens 420 are similar to the configurations and functions of the first excitation light source 110, the filter wheel 130, the lenses 160, the light uniforming element 170, the light valve 210, and the projection lens 220. Therefore, details thereof will not be repeated in the following. Referring to FIG. 7 and FIG. 8, the main difference between a projection apparatus 400 of this embodiment and the projection apparatus 200 of FIG. 1 is that the wavelength conversion wheel 120 of the projection apparatus 200 is a transmissive wavelength conversion wheel, while a wavelength conversion wheel 320 of the embodiment is a reflective wavelength conversion wheel. In detail, the first optical region 124 of the wavelength conversion wheel 120 is a transmissive region, while a first optical region 324 of the wavelength conversion wheel 320 of this embodiment is a reflecting region. The first optical region 324 is, for example, a portion of the substrate S or a highly reflective coating layer, such as a coating layer with a silver-containing compound. In this embodiment, the wavelength conversion region 322 and the first optical region 324 alternately enter the transmission path of the first excitation beam EB1. When the wavelength conversion region 322 enters the transmission path of the first excitation beam EB1, the first excitation beam EB1 is converted into a conversion beam CB by the wavelength conversion region 322, and the conversion beam CB is reflected by the substrate S. When the first optical region 324 enters the transmission path of the first excitation beam EB1, the first excitation beam EB1 is reflected by and output from the first optical region 324.

In this embodiment, the light splitting and combining module 340 of the illumination system 300 includes a dichroic element 342 and a reflecting element 344. The light splitting and combining module 340 is located between the first excitation light source 310 and the wavelength conversion wheel 320 and is located on the transmission paths of the conversion beam CB and the first excitation beam EB1 from the wavelength conversion wheel 320. The reflecting element 344 is disposed on a side of the dichroic element 342 adjacent to the first excitation light source 310. The light splitting and combining module 340 may combine the conversion beam CB and the first excitation beam EB1 from the wavelength conversion wheel 320. Specifically, the dichroic element 342 may be, for example, a dichroic mirror (DM) or a dichroic prism, and can provide different optical effects on beams of different colors. The reflecting element 344 may be a reflecting mirror. For example, in this embodiment, the dichroic element 342 may, for example, allow the first excitation beam EB1 to pass through and reflect the conversion beam CB. Thus, the dichroic element 342 may transmit the first excitation beam EB1 from the first excitation light source 310 to the wavelength conversion wheel 320, and transmit the first excitation beam EB1 reflected by the wavelength conversion wheel 320 to the reflecting element 344 through the dichroic element 342. In addition, when the reflecting element 344 reflects the first excitation beam EB1 to the filter wheel 330, the dichroic element 342 may combine the conversion beam CB from the wavelength conversion wheel 120 and the first excitation beam EB1 reflected by the reflecting element 344 and transmit them to the filter wheel 330.

The filter wheel 330 of this embodiment may be the same as or similar to the filter wheel 130, the filter wheel 130a, the filter wheel 130b, the filter wheel 130c or the filter wheel 130d in the first embodiment, and the same description may be referred to the first embodiment and will not be repeated in the following.

Figure 9A:
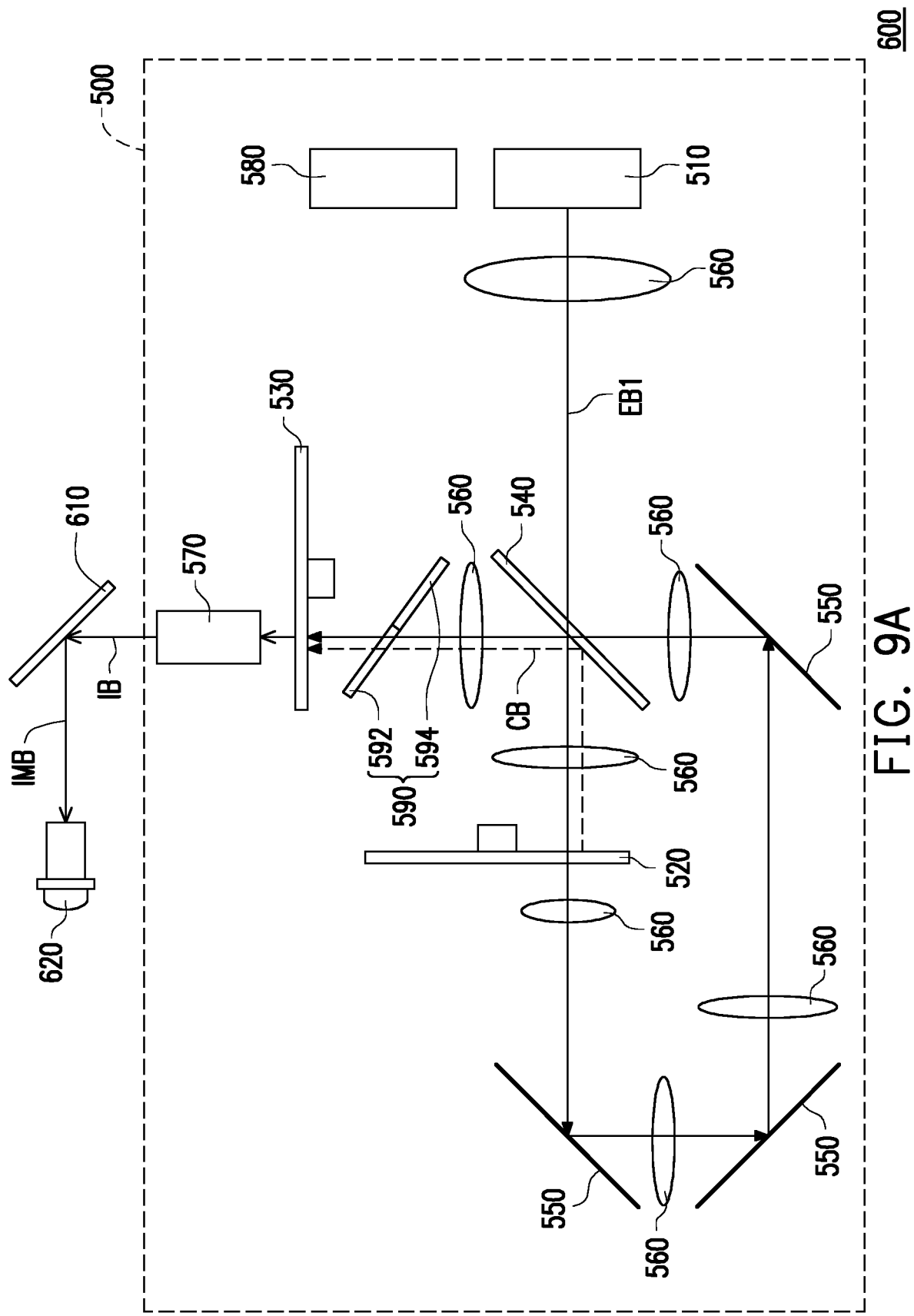
FIG. 9A is a schematic view illustrating a light path of a projection apparatus within a first time interval according to a third embodiment of the invention.
Figure 9B:
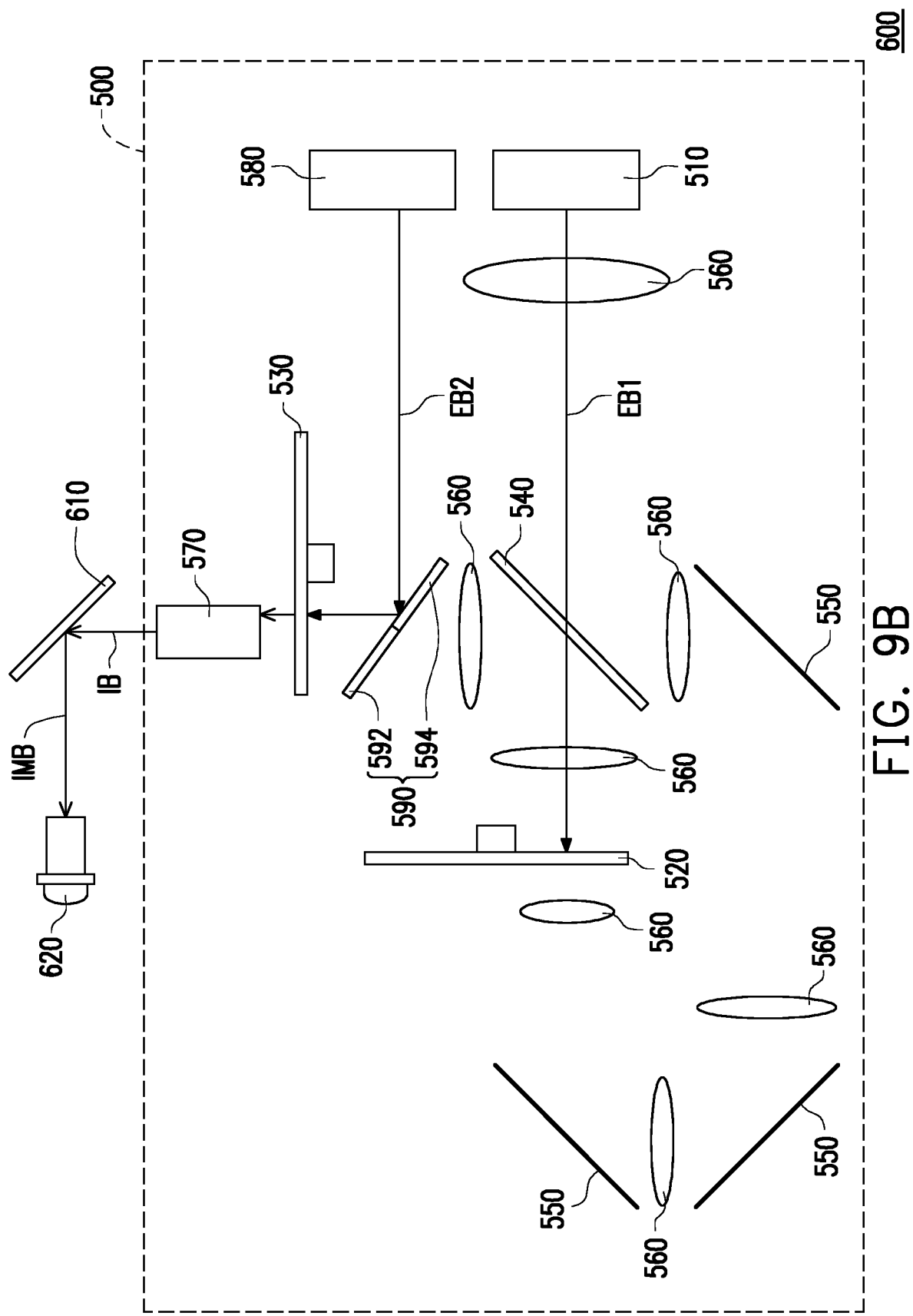
FIG. 9B is a schematic view illustrating a light path of the projection apparatus of FIG. 9A within a second time interval.
Figure 11:
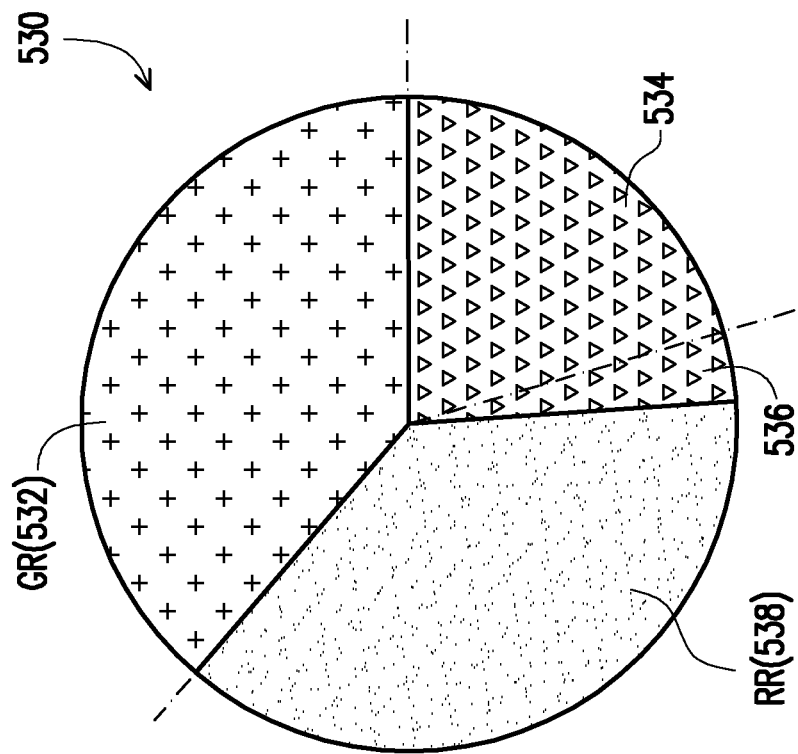
FIG. 11 is a schematic front view illustrating an example of a filter wheel in FIGS. 9A and 9B.
Figure 10:
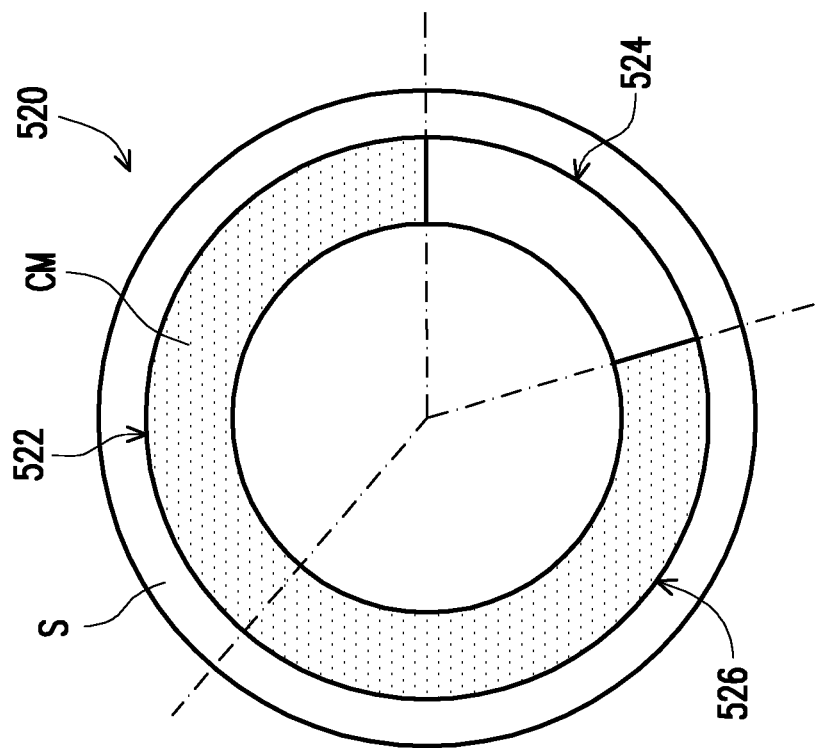
FIG. 10 is a schematic front view illustrating a wavelength conversion wheel of FIGS. 9A and 9B.
Figure 12:
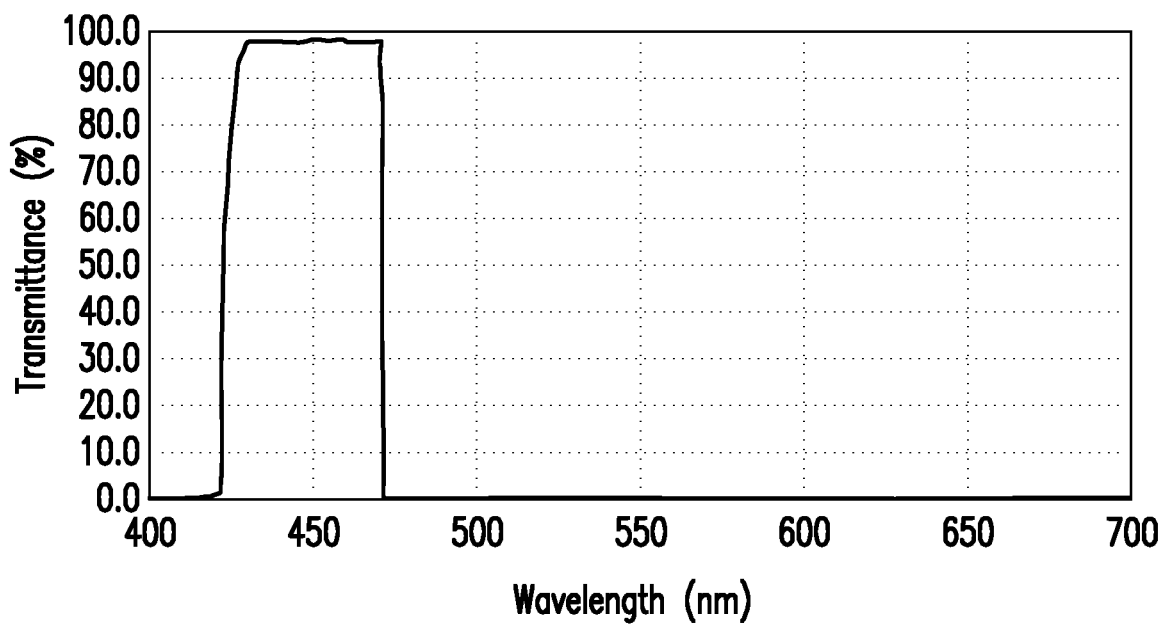
FIG. 12 is a diagram showing a transmittance spectrum of a second region in FIG. 11.

FIG. 9A is a schematic view illustrating a light path of a projection apparatus within a first time interval according to a third embodiment of the invention. FIG. 9B is a schematic view illustrating a light path of the projection apparatus of FIG. 9A within a second time interval. FIG. 10 is a schematic front view illustrating a wavelength conversion wheel of FIGS. 9A and 9B. FIG. 11 is a schematic front view illustrating an example of a filter wheel in FIGS. 9A and 9B. FIG. 12 is a diagram showing a transmittance spectrum of a second region in FIG. 11. In the embodiment shown in FIG. 9A to FIG. 11, the configurations and functions of a first excitation light source 510, a light splitting and combining module 540, reflecting mirrors 550, lenses 560, a light uniforming element 570, a light valve 610, and a projection lens 620 are similar to the configurations and functions of the first excitation light source 110, the light splitting and combining module 140, the reflecting mirrors 150, the lenses 160, the light uniforming element 170, the light valve 210, and the projection lens 220. Therefore, details thereof will not be repeated in the following.

Referring to FIG. 9A, FIG. 9B, FIG. 10 and FIG. 11, the main difference between a projection apparatus 600 of this embodiment and the projection apparatus 200 of FIG. 1 is that a illumination system 500 of the projection apparatus 600 further includes a second excitation light source 580 and a light combining element 590. The second excitation light source 580 is configured to emit a second excitation beam EB2, and the light combining element 590 includes a transmissive portion 592 and a reflecting portion 594. The transmissive portion 592 is located on the transmission path of the first excitation beam EB1 and the conversion beam CB, and the reflecting portion 594 is located on the transmission path of the second excitation beam EB2. In addition, the wavelength conversion wheel 520 includes a wavelength conversion region 522, a first optical region 524 and a second optical region 526, and the filter wheel 530 includes a first region 532, a second region 534, a third region 538, and a blocking region 536.

In this embodiment, the second excitation light source 580 generally refers to a light source capable of emitting a beam of a specific wavelength, and the peak wavelength of the beam falls, for example, within a wavelength range of red light. Here, peak wavelength is defined as the wavelength corresponding to the highest light intensity. The first excitation light source 110 includes a laser diode (LD), a light emitting diode (LED), or an array or bank or a group formed by either of the above. Nevertheless, the invention is not limited thereto. In this embodiment, the second excitation light source 580 is a laser light emitting element including a laser diode. For example, the second excitation light source 580 may be, for example, a red laser diode bank, and the second excitation beam EB2 is a red laser beam. In this embodiment, the wavelength of the second excitation beam EB2 is, for example, greater than or equal to 600 nm. However, the invention is not limited thereto.

As shown in FIG. 10, the wavelength conversion wheel 520 includes the wavelength conversion region 522, the first optical region 524, and the second optical region 526 arranged in a ring shape. In the embodiment, the wavelength conversion substance CM is disposed in the wavelength conversion region 522. The wavelength conversion substance CM is, for example, a yellow phosphor powder. The first optical region 524 is, for example, a transmissive region, and may be a region formed by a transparent plate embedded in the substrate S or a via penetrating through the substrate S. The second optical region 526 is, for example, a wavelength conversion region having the same yellow phosphor powder as that of the wavelength conversion region 522. In other embodiments, the second optical region 526 and the wavelength conversion region 522 may have different phosphor powders. For example, the second optical region 526 may have a yellow phosphor powder and the wavelength conversion region 522 has a green phosphor powder. The wavelength conversion wheel 520 may include a plurality of wavelength conversion regions 522 or a plurality of second optical regions 526. However, the invention is not limited thereto. The configuration in this regard may be determined according to the design adopted by the manufacturer.

As shown in FIG. 11, the filter wheel 530 includes the first region 532, the second region 534, the third region 538, and the blocking region 536 arranged in a ring shape. The first region 532 includes at least one filter region. The number of filter regions of the first region 532 may be one or more and corresponds to the number of the wavelength conversion region 522 of the wavelength conversion wheel 520. The conversion beam CB transmits to all the filter regions of the first region 532. In this embodiment, the first region 532 is described with an example of one filter region and includes the green light filter region GR. The second region 534 is a blue light filter region, for example. The third region 538 includes the red light filter region RR. The blocking region 536 is configured to block the beam from the wavelength conversion wheel 520 from passing through the filter wheel 530. Specifically, when the conversion beam CB is transmitted to the green light filter region GR, the conversion beam CB is filtered to form a green beam. When the first excitation beam EB1 is transmitted to the second region 534, the second region 534 allows the first excitation beam EB1 to pass through to serve as a blue beam, for example. When the second excitation beam EB2 is transmitted to the third region 538, the third region 538 allows the second excitation beam EB2 to pass through to serve as a red beam, for example, and the conversion beam CB transmits to the third region 538. In detail, when the conversion beam CB is transmitted the red light filter region RR, the conversion beam CB is filtered to form a red beam.

When the conversion beam CB or the first excitation beam EB1 from the wavelength conversion wheel 520 or the second excitation beam EB2 from the second excitation light source 580 is transmitted to the blocking region 536, the conversion beam CB, the first excitation beam EB1 or the second excitation beam EB2 does not pass through the blocking region 536.

Referring to FIG. 9A, in the first time interval, the wavelength conversion region 522 and the first optical region 524 of the wavelength conversion wheel 520 sequentially enter the transmission path of the first excitation beam EB1. At this time, the controller (not shown) electrically connected to the second excitation light source 580 controls the second excitation light source 580 not to emit light. When the wavelength conversion region 522 enters the transmission path of the first excitation beam EB1, the first excitation beam EB1 is converted into the conversion beam CB by the wavelength conversion region 522, and the conversion beam CB is reflected by the substrate S. When the first optical region 524 enters the transmission path of the first excitation beam EB1, the first excitation beam EB1 passes through the wavelength conversion wheel 520 and is output from the first optical region 524. In this embodiment, after the light splitting and combining module 540 converges the conversion beam CB and the first excitation beam EB1 from the wavelength conversion wheel 520, the conversion beam CB and the first excitation beam EB1 pass through the transmissive portion 592 of the light combining element 590, so as to be transmitted to the filter wheel 530. In this embodiment, the conversion beam CB is, for example, a green beam or a yellow beam. In other embodiments, the wavelength conversion wheel 520 may also include a plurality of wavelength conversion regions that convert the first excitation beam EB1 into light of different colors respectively.

Referring to FIG. 9B, in the second time interval, when the second optical region 526 of the wavelength conversion wheel 520 enters the transmission path of the first excitation beam EB1, the first excitation beam EB1 is converted into the conversion beam CB by the second optical region 526 having the yellow phosphor powder, and the conversion beam CB is reflected by the substrate S. The light splitting and combining module 540 allows the conversion beam CB from the wavelength conversion wheel 520 to pass through the transmissive portion 592 of the light combining element 590, so as to be transmitted to the filter wheel 530. Meanwhile, the controller (not shown) controls the second excitation light source 580 to emit the second excitation beam EB2 and transmit the second excitation beam EB2 to the reflecting portion 594 of the light combining element 590. The second excitation beam EB2 is reflected by the reflecting portion 594, so as to be transmitted to the filter wheel 530. It should be noted that the second excitation beam EB2 emitted by the second excitation light source 580 and the conversion beam CB generated through the second optical region 526 of the wavelength conversion wheel 520 are transmitted to the third region 538 of the filter wheel 530 together, and a red beam is generated through filtering in the third region 538 of the filter wheel 530.

In detail, in the time interval when the first excitation beam EB1 is transmitted to the wavelength conversion region 522 of the wavelength conversion wheel 520, the conversion beam CB converted by the wavelength conversion region 522 is transmitted to the green light filter region GR of the first region 532 of the filter wheel 530. In the time interval when the first excitation beam EB1 is transmitted to the first optical region 524 of the wavelength conversion wheel 520, the first excitation beam EB1 output from the first optical region 524 is transmitted to the second region 534 of the filter wheel 530. In the time interval when the first excitation beam EB1 is transmitted to the second optical region 526 of the wavelength conversion wheel 520, the conversion beam CB converted by the second optical region 526 is transmitted to the red light filter region RR of the third region 538 of the filter wheel 530. Meanwhile, the second excitation beam EB2 emitted from the second excitation light source 580 is transmitted to the blocking region 536 and the red light filter region RR of the third region 538 of the filter wheel 530.

In this embodiment, as shown in FIG. 11, the blocking region 536 is connected between the red light filter region RR and the second region 534 (e.g., a blue light filter region). The blocking region 536 and the second region 534 are made of the same material and have the same light filtering properties. That is, the blocking region 536 is an extended portion of the second region 534. As shown in FIG. 12, the second region 534 has the maximum transmittance within the wavelength range between about 425 nm and 475 nm, and the second excitation beam EB2 with a wavelength of 640 nm, for example, has a transmittance of less than about 1.0% in the second region 534. Since the blocking region 536 is an extended portion of the second region 534, when the second excitation beam EB2 is transmitted to the blocking region 536 of the filter wheel 530, the blocking region 536 can effectively block the second excitation beam EB2 from passing through and also block the conversion beam CB converted by the second optical region 526.

In other embodiments, the blocking region 536 may be connected between the green light filter region GR and the second region 534, and the blocking region 536 and the second region 534 are made of the same material and have the same light filtering properties. That is, the blocking region 536 is an extended portion of the second region 534.

Figure 13:
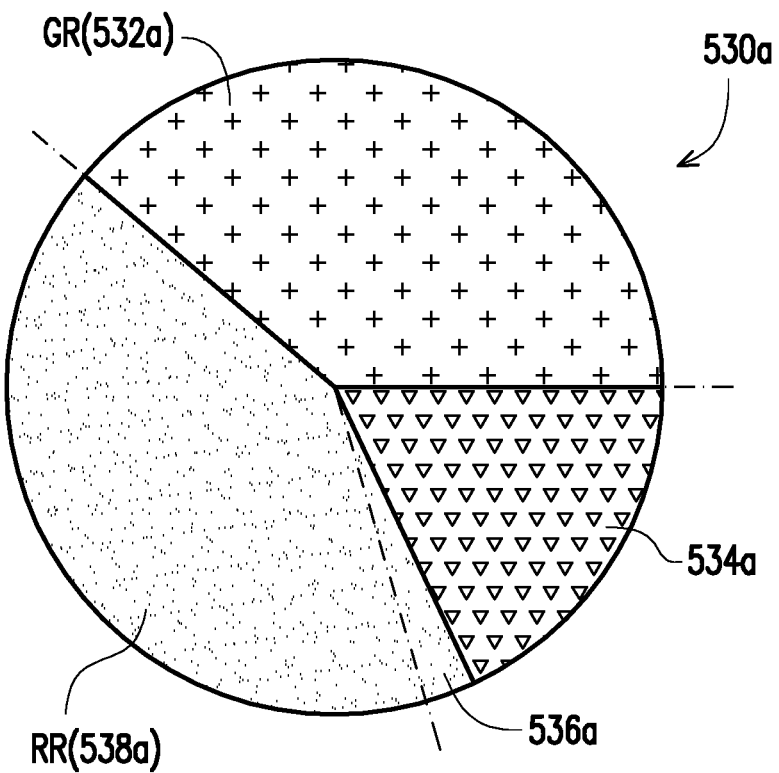
FIG. 13 is a schematic front view illustrating another example of a filter wheel in FIGS. 9A and 9B.

FIG. 13 is a schematic front view illustrating another example of a filter wheel in FIGS. 9A and 9B. Referring to FIG. 13, the difference between a filter wheel 530a of this embodiment and the filter wheel 530 of FIG. 11 is that the second region 534 of the filter wheel 530 is, for example, a blue light filter region, while a second region 534a of the filter wheel 530a may be a blue light filter region or a light transmissive region. In addition, referring to FIG. 10 and FIG. 13, in this embodiment, a blocking region 536a may be arranged in correspondence with the boundary portion of the first optical region 524 of the wavelength conversion wheel 520. The angle covered by the first region 532a in the circumferential direction is equal to the angle covered by the wavelength conversion region 522 in the circumferential direction, the angle covered by the second region 534a and the blocking region 536a in the circumferential direction is equal to the angle covered by the first optical region 524 in the circumferential direction, and the angle covered by a third region 538a in the circumferential direction is equal to the angle covered by the second optical region 526 in the circumferential direction. In detail, in the time interval when the first excitation beam EB1 is transmitted to the wavelength conversion region 522 of the wavelength conversion wheel 520, the conversion beam CB converted by the wavelength conversion region 522 is transmitted to the green light filter region GR of the first region 532a of the filter wheel 530a. In the time interval when the first excitation beam EB1 is transmitted to the first optical region 524 of the wavelength conversion wheel 520, the first excitation beam EB1 output from the first optical region 524 is transmitted to the second region 534a and the blocking region 536a of the filter wheel 530a. In the time interval when the first excitation beam EB1 is transmitted to the second optical region 524 of the wavelength conversion wheel 520, the second excitation beam EB2 emitted from the second excitation light source 580 is transmitted to the red light filter region RR of the third region 538a of the filter wheel 530a.

In this embodiment, as shown in FIG. 13, the blocking region 536a is connected between the red light filter region RR of the third region 538a and the second region 534a. The blocking region 536a and the red light filter region RR are made of the same material. In other words, the blocking region 536a is an extended portion of the red light filter region RR. Therefore, when the first excitation beam EB1, as a blue laser beam for example, is transmitted to the blocking region 536a of the filter wheel 530a, the blocking region 536a can effectively block the first excitation beam EB1 from passing through.

In other embodiments, the blocking region 536a may also be connected between the green light filter region GR and the second region 534a, and the blocking region 536a and the green light filter region GR are made of the same material. In other words, the blocking region 536a is an extended portion of the green light filter region GR.

Figure 14A:
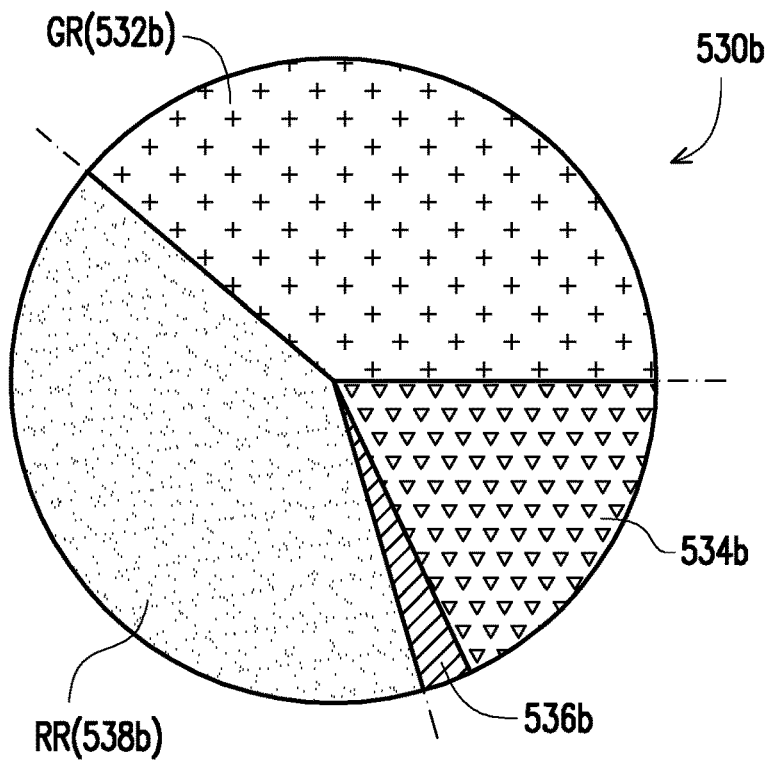
FIGS. 14A to 14C are schematic front views illustrating some other examples of the filter wheel of FIGS. 9A and 9B.
Figure 14B:
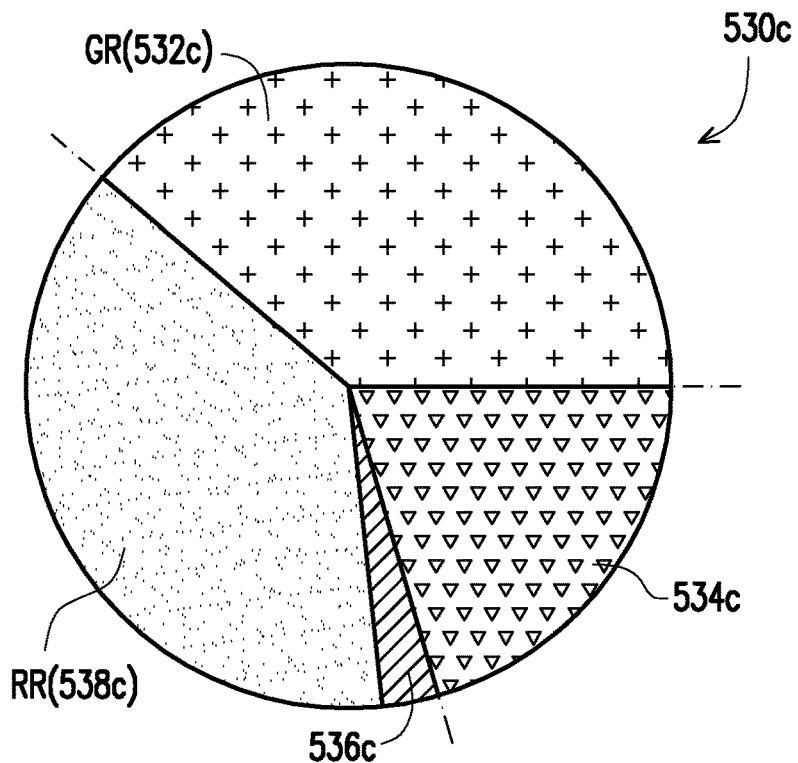
Figure 14C:
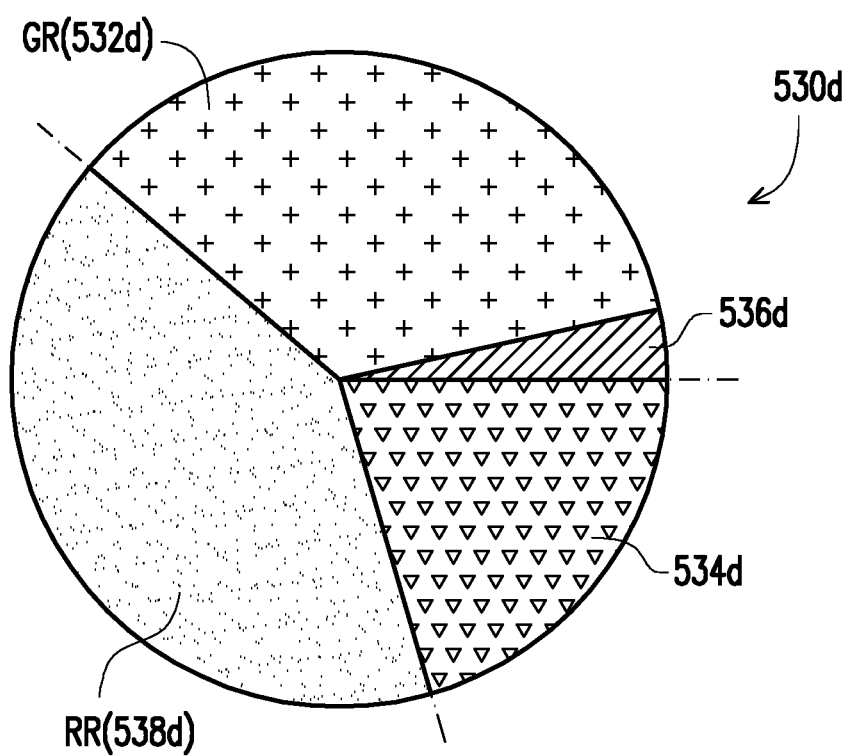

FIGS. 14A to 14C are schematic front views illustrating some other examples of the filter wheel of FIGS. 9A and 9B. Referring to FIG. 14A to FIG. 14C, the filter wheel of this embodiment is different from the filter wheel in the foregoing embodiment in that the blocking region of the filter wheel in the foregoing embodiment is made of the same material as the first region, the second region, or the third region, whereas the blocking region of the filter wheel of the embodiment is, for example, a black absorption region. Therefore, the blocking region of this embodiment can also effectively block the conversion beam CB or the first excitation beam EB1 from the wavelength conversion wheel 520 or the second excitation beam BE2 from the second excitation light source 580 from passing through. In addition, in this embodiment, the second region may be a light transmissive region, or may be a blue light filter region. However, the invention is not limited thereto.

In this embodiment, the blocking region may be arranged in correspondence with the boundary portion of the wavelength conversion region 522, the first optical region 524, or the second optical region 526 of the wavelength conversion wheel 520. For example, as shown in FIG. 10 and FIG. 14A, a blocking region 536b of a filter wheel 530b is arranged in correspondence with a portion of the first optical region 524 of the wavelength conversion wheel 520, and the blocking region 536b is connected between the red light filter region RR of a third region 538b and a second region 534b. In other embodiments, the blocking region 536b may be arranged in correspondence with the boundary portion of the first optical region 524 of the wavelength conversion wheel 520, and the blocking region 536b is connected between the green light filter region GR of the first region 532b and the second region 534b.

As shown in FIG. 10 and FIG. 14B, a blocking region 536c of a filter wheel 530c is arranged in correspondence with a portion of the second optical region 526 of the wavelength conversion wheel 520, and the blocking region 536c is connected between the red light filter region RR of a third region 538c and a second region 534c. In other embodiments, the blocking region 536c may also be arranged in correspondence with the boundary portion of the second optical region 526 of the wavelength conversion wheel 520, and the blocking region 536c is connected between the red light filter region RR of the third region 538c and the green light filter region GR of a first region 532c.

As shown in FIG. 10 and FIG. 14C, a blocking region 536d of a filter wheel 530d is arranged in correspondence with a portion of the wavelength conversion region 522 of the wavelength conversion wheel 520, and the blocking region 536d is connected between the green light filter region GR of a first region 532d and a second region 534d. In other embodiments, the blocking region 536d of the filter wheel 530d may be arranged in correspondence with the boundary portion of the wavelength conversion region 522 of the wavelength conversion wheel 520, and the blocking region 536d is connected between the green light filter region GR of the first region 532d and the red light filter region RR of the third region 538d.

Through the above configuration of the blocking region, the beam from the wavelength conversion wheel or the second excitation light source can be blocked from passing through the filter wheel by arranging the blocking region in a desired interval. Therefore, the filter wheel can be prevented from outputting an undesired colored beam in the time interval when the beam is irradiated to the blocking region. In this way, a color difference of the image beam can be avoided.

Figure 15A:
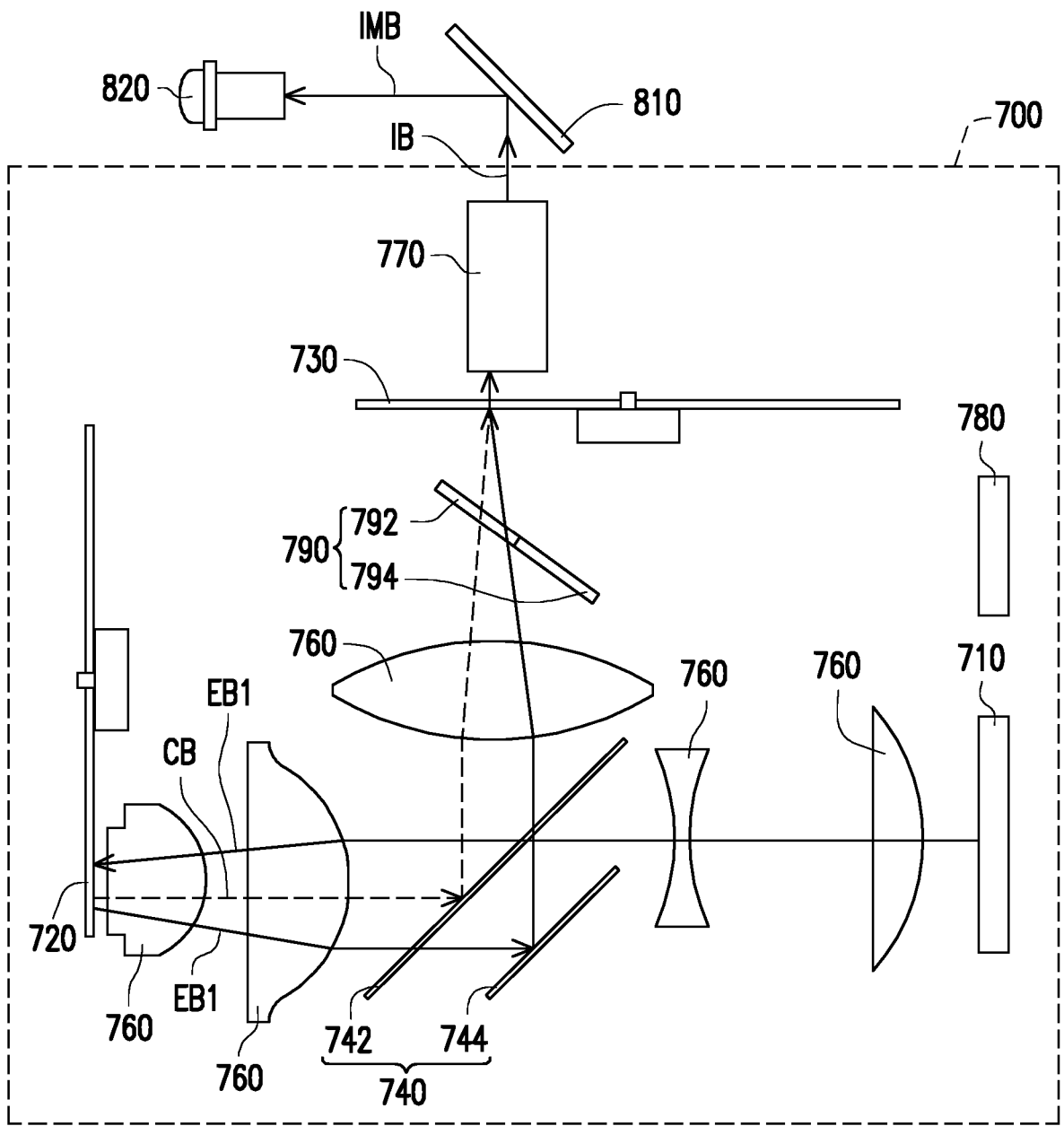
FIG. 15A is a schematic view illustrating a light path of a projection apparatus within a first time interval according to a fourth embodiment of the invention.
Figure 15B:
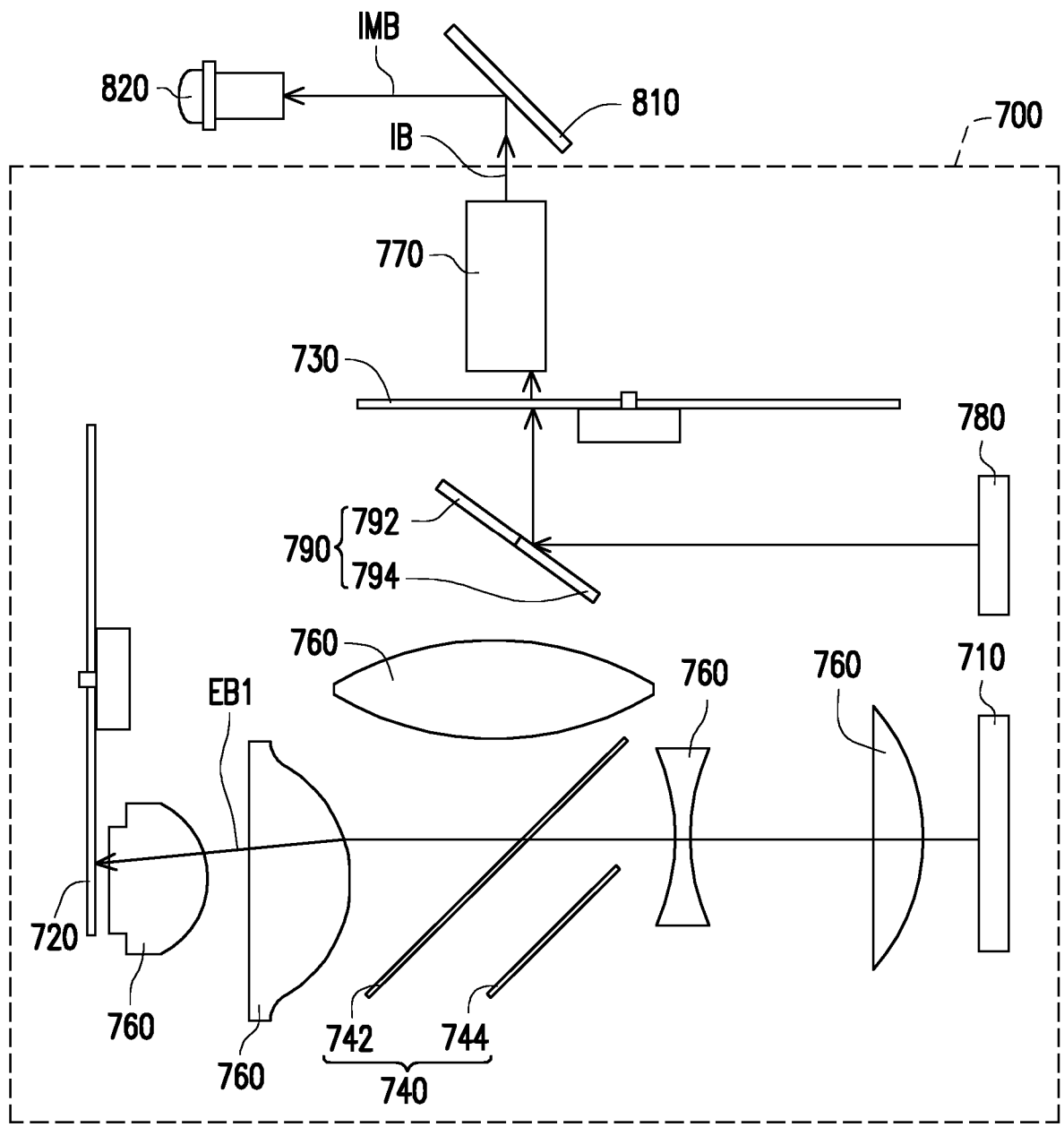
FIG. 15B is a schematic view illustrating a light path of the projection apparatus of FIG. 15A within a second time interval.
Figure 16:
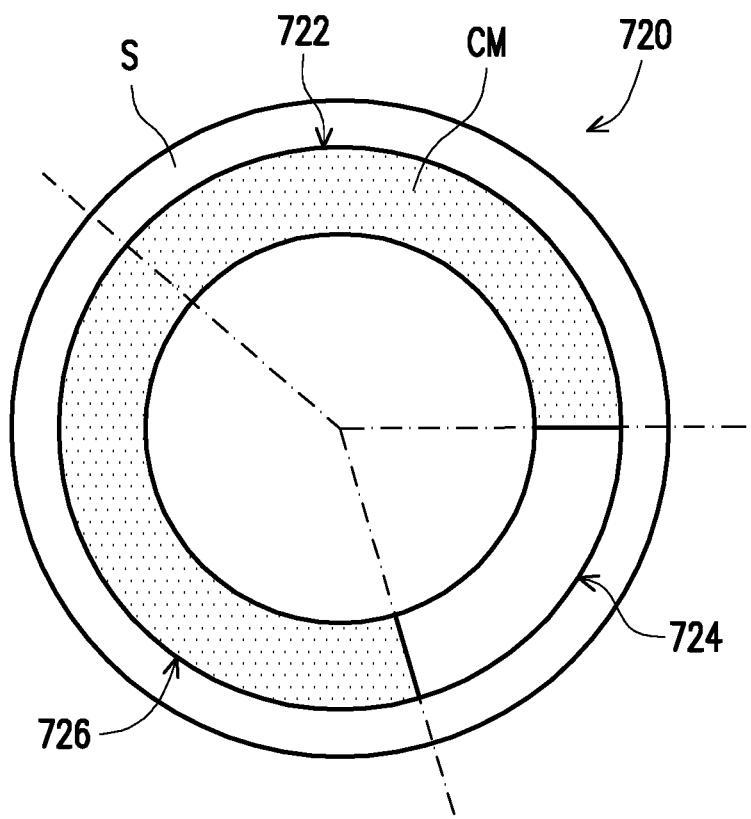
FIG. 16 is a schematic front view illustrating a wavelength conversion wheel of FIGS. 15A and 15B.

FIG. 15A is a schematic view illustrating a light path of a projection apparatus within a first time interval according to a fourth embodiment of the invention. FIG. 15B is a schematic view illustrating a light path of the projection apparatus of FIG. 15A within a second time interval. FIG. 16 is a schematic front view illustrating a wavelength conversion wheel of FIGS. 15A and 15B. In the embodiment shown in FIGS. 15A to 16, the configurations and functions of a first excitation light source 710, a filter wheel 730, lenses 760, a light uniforming element 770, a second excitation light source 780, a light combining element 790 (including a transmissive portion 792 and a reflexive portion 794), a light valve 810, and a projection lens 820 are similar to the configurations and functions of the first excitation light source 510, the filter wheel 530, the lenses 560, the light uniforming element 570, the second excitation light source 580, the light combining element 590, the light valve 610, and the projection lens 620 of the third embodiment. Therefore, details thereof will not be repeated in the following. Referring to FIG. 15A to FIG. 16, the main difference between a projection apparatus 800 of this embodiment and the projection apparatus 600 of FIG. 9A and 9B is that the wavelength conversion wheel 520 of the projection apparatus 600 is a transmissive wavelength conversion wheel, while a wavelength conversion wheel 720 of the embodiment is a reflective wavelength conversion wheel. In detail, the first optical region 524 of the wavelength conversion wheel 520 is a transmissive region, while a first optical region 724 of the wavelength conversion wheel 720 is a reflecting region. The first optical region 724 is, for example, a portion of the substrate S or a highly reflective coating layer, such as a coating layer with a silver-containing compound. In addition, the configuration of a second optical region 726 of the wavelength conversion wheel 720 is the same as the configuration of the second optical region 526 of the wavelength conversion wheel 520. Therefore, details in this regard will not be repeated in the following. In this embodiment, the wavelength conversion region 722, the first optical region 724, and the second optical region 726 alternately enter the transmission path of the first excitation beam EB1. When the wavelength conversion region 722 enters the transmission path of the first excitation beam EB1, the first excitation beam EB1 is converted into the conversion beam CB by the wavelength conversion region 722, and the conversion beam CB is reflected by the substrate S. When the first optical region 724 enters the transmission path of the first excitation beam EB1, the first excitation beam EB1 is reflected by and output from the first optical region 724. When the second optical region 726 enters the transmission path of the first excitation beam EB1, the first excitation beam EB1 is converted into the conversion beam CB by the second optical region 726, and the conversion beam CB is reflected by the substrate S.

In this embodiment, the light splitting and combining module 740 of the illumination system 700 includes a dichroic element 742 and a reflecting element 744. The configurations and functions of the dichroic element 742 and the reflecting element 744 are similar to the configurations and functions of the dichroic element 342 and the reflecting element 344 of the second embodiment. Therefore, details in this regard will not be repeated in the following. In addition, the filter wheel 730 of this embodiment may be the same as or similar to the filter wheel 530, the filter wheel 530a, the filter wheel 530b, the filter wheel 530c or the filter wheel 530d in the third embodiment, and the same description may be referred to the third embodiment and will not be repeated in the following.

In view of the foregoing, in the illumination system according to the embodiments of the invention, the beam is blocked from passing through the filter wheel by arranging the blocking region in the desired interval. Therefore, the filter wheel can be prevented from outputting an undesired colored beam in the time interval when the beam is irradiated to the blocking region. Since the projection apparatus according to the embodiments of the disclosure adopts the illumination system, the color difference is avoided through a simple means.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An illumination system, comprising a first excitation light source, a wavelength conversion wheel, and a filter wheel, wherein:
   the first excitation light source is configured to emit a first excitation beam;
   the wavelength conversion wheel comprises a wavelength conversion region and a first optical region, the wavelength conversion region and the first optical region alternately enter a transmission path of the first excitation beam, the first excitation beam is converted into a conversion beam by the wavelength conversion region when the wavelength conversion region enters the transmission path of the first excitation beam, and the first excitation beam is output from the first optical region when the first optical region enters the transmission path of the first excitation beam; and
   the filter wheel is disposed on a transmission path of the conversion beam and the first excitation beam, the filter wheel comprises a first region, a second region, and a blocking region, wherein an angle covered by the second region in a circumferential direction is smaller than an angle covered by the first optical region.

2. The illumination system as claimed in claim 1, wherein the first optical region comprises a transmissive region.

3. The illumination system as claimed in claim 1, wherein the first optical region comprises a reflecting region.

4. The illumination system as claimed in claim 1, wherein the first region comprises at least one filter region, and the conversion beam is transmitted to all the at least one filter region of the first region, wherein the blocking region is connected between the at least one filter region and the second region.

5. The illumination system as claimed in claim 4, wherein the blocking region and the at least one filter region or the second region are made of the same material.

6. The illumination system as claimed in claim 1, wherein the blocking region is a black absorption region.

7. The illumination system as claimed in claim 1, wherein the first region comprises a plurality of filter regions, and the blocking region is connected between two adjacent ones of the filter regions.

8. The illumination system as claimed in claim 1, wherein an angle covered by the first region in the circumferential direction is equal to an angle covered by the wavelength conversion region in the circumferential direction, and an angle covered by the second region and the blocking region in the circumferential direction is equal to the angle covered by the first optical region in the circumferential direction.

9. The illumination system as claimed in claim 1, wherein the wavelength conversion wheel further comprises a second optical region, the filter wheel further comprises a third region, and the illumination system further comprises a second excitation light source, wherein in a time interval when the first excitation beam is transmitted to the second optical region, the second excitation light source emits a second excitation beam, and the second excitation beam is transmitted to the filter wheel.

10. The illumination system as claimed in claim 9, wherein the first region comprises at least one filter region, and the conversion beam is transmitted to all the at least one filter region of the first region, wherein the blocking region is connected between the at least one filter region and the second region, and the blocking region and the at least one filter region or the second region are made of the same material.

11. The illumination system as claimed in claim 9, wherein the blocking region is connected between the second region and the third region, and the blocking region and the third region are made of the same material.

12. An illumination system, comprising a first excitation light source, a wavelength conversion wheel, and a filter wheel, wherein:
the first excitation light source is configured to emit a first excitation beam;
the wavelength conversion wheel comprises a wavelength conversion region and a first optical region, the wavelength conversion region and the first optical region alternately enter a transmission path of the first excitation beam, the first excitation beam is converted into a conversion beam by the wavelength conversion region when the wavelength conversion region enters the transmission path of the first excitation beam, and the first excitation beam is output from the first optical region when the first optical region enters the transmission path of the first excitation beam; and
the filter wheel is disposed on a transmission path of the conversion beam and the first excitation beam from the wavelength conversion wheel, the filter wheel comprises a first region, a second region, and a blocking region, wherein the blocking region is configured to block the first excitation beam or the conversion beam transmitted from the wavelength conversion wheel from passing through the filter wheel.

13. The illumination system as claimed in claim 12, wherein the first optical region comprises a transmissive region.

14. The illumination system as claimed in claim 12, wherein the first optical region comprises a reflecting region.

15. The illumination system as claimed in claim 12, wherein the first region comprises at least one filter region, and the conversion beam is transmitted to all the at least one filter region of the first region, wherein the blocking region is connected between the at least one filter region and the second region.

16. The illumination system as claimed in claim 15, wherein the blocking region and the at least one filter region or the second region are made of the same material.

17. The illumination system as claimed in claim 12, wherein the blocking region is a black absorption region.

18. The illumination system as claimed in claim 12, wherein the first region comprises a plurality of filter regions, the blocking region is connected between two adjacent ones of the filter regions, and the blocking region is a black absorption region.

19. The illumination system as claimed in claim 12, wherein an angle covered by the first region and the blocking region in a circumferential direction is equal to an angle covered by the wavelength conversion region in the circumferential direction, and an angle covered by the second region in the circumferential direction is equal to an angle covered by the first optical region in the circumferential direction.

20. The illumination system as claimed in claim 12, wherein an angle covered by the first region in the circumferential direction is equal to an angle covered by the wavelength conversion region in the circumferential direction, and an angle covered by the second region and the blocking region in the circumferential direction is equal to the angle covered by the first optical region in the circumferential direction.

21. The illumination system as claimed in claim 12, wherein the wavelength conversion wheel further comprises a second optical region, the filter wheel further comprises a third region, and the illumination system further comprises a second excitation light source, wherein in a time interval when the first excitation beam is transmitted to the second optical region, the second excitation light source emits a second excitation beam, and the second excitation beam is transmitted to the filter wheel.

22. The illumination system as claimed in claim 21, wherein the first region comprises at least one filter region, and the conversion beam is transmitted to all the at least one filter region of the first region, wherein the blocking region is connected between the at least one filter region and the second region, and the blocking region and the at least one filter region or the second region are made of the same material.

23. The illumination system as claimed in claim 21, wherein the blocking region is connected between the second region and the third region, and the blocking region and the second region or the third region are made of the same material.

24. The illumination system as claimed in claim 21, wherein the first region comprises at least one filter region, and the conversion beam is transmitted to all the at least one filter region of the first region, wherein the blocking region is connected between the at least one filter region and the third region, and the blocking region and the at least one filter region or the third region are made of the same material.

25. The illumination system as claimed in claim 21, wherein the blocking region is a black absorption region.

26. The illumination system as claimed in claim 21, wherein an angle covered by the first region and the blocking region in the circumferential direction is equal to an angle covered by the wavelength conversion region in the circumferential direction.

27. The illumination system as claimed in claim 21, wherein an angle covered by the second region and the blocking region in the circumferential direction is equal to an angle covered by the first optical region in the circumferential direction.

28. The illumination system as claimed in claim 21, wherein an angle covered by the third region and the blocking region in the circumferential direction is equal to an angle covered by the second optical region in the circumferential direction.

29. The illumination system as claimed in claim 21, wherein the blocking region is configured to block the second excitation beam from the second excitation light source from passing through the filter wheel.

30. A projection apparatus, comprising an illumination system, a light valve, and a projection lens, wherein:
the illumination system is configured to emit an illumination beam, and comprises a first excitation light source, a wavelength conversion wheel, and a filter wheel, wherein:
the first excitation light source is configured to emit a first excitation beam;
the wavelength conversion wheel comprises a wavelength conversion region and a first optical region, the wavelength conversion region and the first optical region alternately enter a transmission path of the first excitation beam, the first excitation beam is converted into a conversion beam by the wavelength conversion region when the wavelength conversion region enters the transmission path of the first excitation beam, and the first excitation beam is output from the first optical region when the first optical region enters the transmission path of the first excitation beam; and
the filter wheel is disposed on a transmission path of the conversion beam and the first excitation beam from the wavelength conversion wheel, the filter wheel comprises a first region, a second region, and a blocking region, wherein the second region allows the first excitation beam to pass through, and an angle covered by the second region in a circumferential direction is smaller than an angle covered by the first optical region;
the light valve is disposed on a transmission path of the illumination beam to modulate the illumination beam into an image beam; and
the projection lens is disposed on a transmission path of the image beam.

31. The projection apparatus as claimed in claim 30, wherein the first optical region of the wavelength conversion wheel comprises a transmissive region.

32. The projection apparatus as claimed in claim 30, wherein the first optical region of the wavelength conversion wheel comprises a reflecting region.

33. A projection apparatus, comprising an illumination system, a light valve, and a projection lens, wherein:
the illumination system is configured to emit an illumination beam, and comprises a first excitation light source, a wavelength conversion wheel, and a filter wheel, wherein:
the first excitation light source is configured to emit a first excitation beam;
the wavelength conversion wheel comprises a wavelength conversion region and a first optical region, the wavelength conversion region and the first optical region alternately enter a transmission path of the first excitation beam, the first excitation beam is converted into a conversion beam by the wavelength conversion region when the wavelength conversion region enters the transmission path of the first excitation beam, and the first excitation beam is output from the first optical region when the first optical region enters the transmission path of the first excitation beam; and
the filter wheel is disposed on the transmission path of the conversion beam and the first excitation beam, the filter wheel comprises a first region, a second region, and a blocking region, wherein the second region allows the first excitation beam to pass through, and the blocking region is configured to block the first excitation beam or the conversion beam transmitted from the wavelength conversion wheel from passing through the filter wheel;
the light valve is disposed on a transmission path of the illumination beam to modulate the illumination beam into an image beam; and
the projection lens is disposed on a transmission path of the image beam.

34. The projection apparatus as claimed in claim 33, wherein the first optical region of the wavelength conversion wheel comprises a transmissive region.

35. The projection apparatus as claimed in claim 33, wherein the first optical region of the wavelength conversion wheel comprises a reflecting region.

36. The projection apparatus as claimed in claim 33, wherein the illumination system further comprises a second excitation light source, the second excitation light source is configured to emit a second excitation beam, the second excitation beam is transmitted to the filter wheel, and the blocking region is configured to block the second excitation beam from the second excitation light source from passing through the filter wheel.

\* \* \* \* \*